United States Patent
Rose et al.

(10) Patent No.: US 12,041,046 B2
(45) Date of Patent: *Jul. 16, 2024

(54) SYSTEM AND METHOD FOR IDENTITY MANAGEMENT OF CLOUD BASED COMPUTING SERVICES IN IDENTITY MANAGEMENT ARTIFICIAL INTELLIGENCE SYSTEMS

(71) Applicant: SailPoint Technologies, Inc., Wilmington, DE (US)

(72) Inventors: Brian Eric Rose, Austin, TX (US); Nicholas Ryan Wellinghoff, Austin, TX (US)

(73) Assignee: SAILPOINT TECHNOLOGIES, INC., Wilmington, DE (US)

(*) Notice: Subject to any disclaimer, the term of this patent is extended or adjusted under 35 U.S.C. 154(b) by 27 days.

This patent is subject to a terminal disclaimer.

(21) Appl. No.: 17/944,319

(22) Filed: Sep. 14, 2022

(65) Prior Publication Data
US 2023/0021041 A1 Jan. 19, 2023

Related U.S. Application Data

(63) Continuation of application No. 16/942,416, filed on Jul. 29, 2020, now Pat. No. 11,516,203, which is a continuation of application No. 16/858,026, filed on Apr. 24, 2020, now Pat. No. 10,798,084.

(60) Provisional application No. 62/840,469, filed on Apr. 30, 2019.

(51) Int. Cl.
*H04L 29/06* (2006.01)
*H04L 9/40* (2022.01)
*H04L 67/10* (2022.01)

(52) U.S. Cl.
CPC ........ *H04L 63/0815* (2013.01); *H04L 63/102* (2013.01); *H04L 63/20* (2013.01); *H04L 67/10* (2013.01)

(58) Field of Classification Search
CPC . H04L 63/0815; H04L 63/102; H04L 63/101; H04L 63/20; H04L 63/104
USPC .......................................................... 726/8
See application file for complete search history.

(56) References Cited

U.S. PATENT DOCUMENTS

| | | | |
|---|---|---|---|
| 9,276,942 B2 * | 3/2016 | Srinivasan | H04L 63/101 |
| 9,692,748 B2 * | 6/2017 | Maheshwari | H04L 63/08 |
| 11,178,182 B2 | 11/2021 | Saxena | |
| 2015/0269383 A1 | 9/2015 | Lang | |
| 2018/0069899 A1 | 3/2018 | Lang | |
| 2019/0327271 A1 | 10/2019 | Saxena | |

OTHER PUBLICATIONS

CIS Benchmarks, CIS Amazon Web Services Foundations, v1.2.0, May 23, 2018, 158 pages.

(Continued)

*Primary Examiner* — Longbit Chai
(74) *Attorney, Agent, or Firm* — Sprinkle IP Law Group

(57) ABSTRACT

Systems and methods for embodiments of artificial intelligence systems for identity management are disclosed. Specifically, embodiments of an identity management system may provide identity management in association with cloud services used by an enterprise and, in particular, may provide identity management in association with cloud based services that may be accessed through federated access providers.

21 Claims, 11 Drawing Sheets

(56) References Cited

OTHER PUBLICATIONS

International Search Report and Written Opinion issued in PCT Application No. PCT/US19/28390, mailed Jul. 18, 2019, 9 pages.
Office Action issued in U.S. Appl. No. 16/389,755, mailed Apr. 21, 2021, 12 pages.
International Preliminary Report on Patentability mailed Oct. 20, 2020, and Written Opinion mailed Jul. 18, 2019, issued in International Patent Application No. PCT/US19/28390, 7 pages.
Notice of Allowance issued in U.S. Appl. No. 16/389,755, mailed Aug. 2, 2021, 15 pages.

* cited by examiner

FIG. 1B

CLOUD IDENTITY MANAGER 180
- 182 CONNECTOR
- 144 LOG PROCESSOR
- 181 USER INTERFACE
- 185 SYNTHETIC ROLE INTEGRATOR

DATA STORE
- 194 CLOUD SERVICE PROVIDER LOG
- 183 SYNTHETIC ROLE DEFINITION
  - IAM ENTITY ENTITLEMENT 196
  - CLOUD ACCESS ENTITLEMENT 107

- 170 SERVICE
- 170 SERVICE
- 152 ADMINISTRATOR INTERFACE
- 158 USER INTERFACE

CONNECTORS 156
- 156a FAP CONNECTOR
- 156b CSP CONNECTOR

SYNC PIPELINE
- 165 AGGREGATOR
- 167 SYNC INTERFACE
- 164

SEARCH SYSTEM
- 168 SEARCH INTERFACE
- 162 DOCUMENT STORE
  - 161 DOCUMENTS
- 160

FROM FIG. 1A

IDENTITY MANAGEMENT SYSTEM 150

IDENTITY MANAGEMENT DATA STORE 155

IDENTITY CUBE 153
- 151 FAP NATIVE ACCOUNT
  - ID 142
  - 157 SYNTHETIC ROLE
- 196 IAM ENTITY ENTITLEMENT
- 107 CLOUD ACCESS ENTITLEMENT
- 146 CSP EVENTS

IDENTITY DATA 154

- 157 SYNTHETIC ROLE
  - 107 CLOUD ACCESS ENTITLEMENT
- 196 IAM ENTITY ENTITLEMENT
- 159 IDENTITY MANAGEMENT ARTIFACTS DEFINITIONS

FIG. 3A

Edit Task
Standard Properties
*Indicates a required field.

| Name* | AWS Federation Role Sync |
| Description | Creates IIQ Federation roles to represent AWS roles with federation trust relationships that map to a enterprise directory. |
| Allow Concurrency | ☐ |
| Require Signoff | ☐ |
| Host | |
| Number of Runs | 0 |
| Average Run Time | 0:00:00 |
| | Reset Run Statistics |

Previous Result Action [Delete ▼]

Email Task Alerts
Email Notification [Disabled ▼]

AWS Federation Role Sync Options

| AWS Application | | AWS Application ▼ |
| Enterprise Directory Application | | HR Application ▼ |
| Group RegEx | | |

Enterprise Directory Group

| AWS Federation Role | ▼ | Enterprise Directory Group ▼ | [Add] |

Federation Role Mapping

| AWS Federation Role | | Enterprise Directory Group |
| ☐ arn:aws:iam::692127186443:role/FederatedAdminAccess | | EngineeringAdmin |

[Save] [Save and execute] [Cancel] [Refresh]

FIG. 3B

| SailPoint | | | | | | | ⚙ ▾ | 🔔 ▾ | The Administrator |
|---|---|---|---|---|---|---|---|---|---|
| Home | My Work ▾ | Identities ▾ | Applications ▾ | Intelligence ▾ | Setup ▾ | | | | |

Role Management

| Role Viewer | Role Search | Entitlement Analysis | Role Mining | Role Mining Results | | New Role ▾ |
|---|---|---|---|---|---|---|

Role Navigation «

[Top Down] [Bottom Up] [Grid] [Refresh]

[Enter a role Name] [Reset]

⊟ 📁 AWS Federation Roles
    👤 AWS Federated Access to sp.org.demo/FederatedAdminAccess

Role Information

Attributes «
- Name: 692127186443/FederatedAdminAccess
- Display Name: AWS Federated access to sp.org.demo/FederatedAdminAccess
- Owner: None
- Scope: None
- Type: Federation
- Description: This role is enabled

Extended Attributes «
- Federated managed entitlement id granted by this role: 8a80cb81653b4a7a01653b5d492a0350

Role Statistics «
[Refresh]

Inherited Roles »

Direct Entitlements »

| Application | Property | Value |
|---|---|---|
| HR Application | memberOf | EngineeringAdmin |

[|◁] [◁] Page [1] of 1 [▷] [▷|] 🔄

[Edit Role]

SailPoint

≡ Home My Work ▼ Identities ▼ Applications ▼ Intelligence ▼ Setup ▼ ⚙ ▼ 💬 ⓘ The Administrator Manage User Access

Select Users
1 Find and select users for whom you want to manage access.

2 Manage Access
Add access for the users you've selected.

3 Review and Submit
Look over your selections and confirm.

| Add Access | Remove Access |

Search by Keywords ▼ | Search Access 🔍 ▽ Filters ▼

Users Selected: Darran Riley          Showing 1-3 of 3

⌄ AWS Federated Access to sp.org.demo/FederatedAdminAccess                    [Details]
Gives federated admin access to users in the FederatedAdminAccess group in the enterprise active directory instance
Type: Role ⌄ AWS Federated Access to sp.org.demo/FederatedAmazonAppStreamFullAccess      [Details]
Provides full access to amazon AppStream via the AWS Management Console
Type: Role ⌄ AWS Federated Access to sp.org.demo/FederatedBusinessReadOnlyRoleForAlexa   [Details]
Provide read only access to AlexaForBusiness services
Type: Role Users Selected: Darran Riley           Showing 1-3 of 3

[Previous] [Next]

©Copyright 2018 SailPoint Technologies - All rights reserved.

FIG. 4C

| Type | Display Name | Description | Application | Account Name | Identity | Decision |
|---|---|---|---|---|---|---|
| Role | AWS Federated Access to sp.org.demo/ FederatedBusinessReadOnlyRoleForAlexa | Provide read only access to AlexaForBusiness services | | | Darran Riley | Approve / Revoke |
| Entitlement | AdministratorAccess on AWSManagedPolicies | Provides full access to AWS services and resources | AWS Application | brian-test-user | Darran Riley | Approve / Revoke |
| Entitlement | AWS Policy with Conditions on CustomerManagedPolicies | brian-test-condition-policy | AWS Application | brian-test-user | Darran Riley | Approve / Revoke |
| Entitlement | OrgWideAccessGroup on Groups | arn:aws:iam:: 369212718443:group/ OrgWideAccessGroup | AWS Application | brian-test-user | Darran Riley | Approve / Revoke |

FIG. 4D

SYSTEM AND METHOD FOR IDENTITY MANAGEMENT OF CLOUD BASED COMPUTING SERVICES IN IDENTITY MANAGEMENT ARTIFICIAL INTELLIGENCE SYSTEMS

RELATED APPLICATIONS

This application is a continuation of, and claims a benefit of priority under 35 U.S.C. 120 of U.S. patent application Ser. No. 16/942,416, filed Jul. 29, 2020, entitled "SYSTEM AND METHOD FOR IDENTITY MANAGEMENT OF CLOUD BASED COMPUTING SERVICES IN IDENTITY MANAGEMENT ARTIFICIAL INTELLIGENCE SYSTEMS," now issued as U.S. Pat. No. 11,516,203, which claims a benefit of priority under 35 U.S.C. 120 of U.S. patent application Ser. No. 16/858,026 filed Apr. 24, 2020, entitled "SYSTEM AND METHOD FOR IDENTITY MANAGEMENT OF CLOUD BASED COMPUTING SERVICES IN IDENTITY MANAGEMENT ARTIFICIAL INTELLIGENCE SYSTEMS," issued as U.S. Pat. No. 10,798,084, which claims a benefit of priority under 35 U.S.C. 119(e) to U.S. Provisional Application No. 62/840,469 filed Apr. 30, 2019, entitled "SYSTEMS AND METHODS FOR IDENTITY MANAGEMENT IN ASSOCIATION WITH USE OF CLOUD COMPUTING SERVICES," all of which are hereby fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records but reserves all other copyright rights whatsoever.

TECHNICAL FIELD

This disclosure relates generally to computer security. In particular, this disclosure relates to the application of artificial intelligence to identity management in a distributed and networked computing environment. Even more specifically, this disclosure relates to enhancing computer security in a distributed networked computing environment by providing identity management for cloud based computing services in distributed network computer environments that utilize such cloud based computing services.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises or organizations, including for example, provisioning, certifications, access reviews, and Separation of Duties (SOD) processes.

Such IM goals are especially difficult with respect to enterprises that employ or otherwise utilize cloud based computing platforms or services (collectively cloud based computer services, cloud service providers or just cloud services or platform, all used herein interchangeably).

What is desired, therefore, are improved systems and methods for identity governance in an enterprise environment that utilizes cloud based computing services.

SUMMARY

As discussed, identity management systems are designed to deliver the capability for the creation, ongoing management, display, and distribution of detailed and relevant contextual identity governance information for an enterprise. Increasingly, however, enterprises are moving functionality and sensitive data to the cloud platforms. Identity governance with respect to these cloud based platforms utilized by an enterprise is challenging.

Often times these cloud services have their own proprietary identity or access management (IAM) capabilities. Thus, access to the cloud computing platform may be controlled using the entities (e.g., IAM entities) cloud computing platforms provide. However, the use of cloud computing environments actually complicates identity governance. One issue with identity governance with respect to such cloud service providers is that the IAM entities of a cloud computing platform may allow multiple users of the enterprise to be associated with the same IAM entity used to manage access to the cloud computing platform. Additionally, many enterprises employ federated access services or platforms within their enterprises. These federation services may allow a user to access entitlements associated with a cloud computing platform employed by the enterprise. Complicating this access pattern even further is that such entitlements may be granted by the federated access service based on the user's association with one or more indirect assignments of entitlements, and may do so using a single sign on capability.

As can be seen then, it may be extremely difficult to track what users within an enterprise have been assigned entitlements with respect to cloud computing platforms and how those entitlements are being utilized with respect to the cloud services platform. Identity governance with respect to such cloud service providers is, however, critical to identity management with respect to an enterprise, and is only growing in importance as increasing amounts of functionality and data migrate to such cloud service providers. Enterprises may thus wish to perform identity governance with respect to these cloud service providers and to do so in a similar manner to which they perform identity management with respect to the other aspects of the enterprise.

To those ends, among others, embodiment of an identity management system may provide identity management for cloud services used by an enterprise and, in particular, may provide identity management in association with cloud based services that may be accessed through federated access providers of the enterprise. In particular, the identity management system may provide the ability to generate a synthetic role that may establish a mapping between a set of identity management artifacts (e.g., entitlements, groups, etc.) associated with a federated access provider and a set of artifacts associated with a cloud services provider, where the set of identity management artifacts associated with the federated access provider may be those artifacts (e.g., entitlements, roles, groups, etc.) that grant access to the associated identity management artifacts (e.g., entitlement, etc.) associated with the cloud service provider.

This synthetic role may be defined as a role according to the model of the identity management system and can thus be requested, assigned, or otherwise managed or manipulated by or through the identity management system like any other type of role utilized with the identity management system and may be assigned to an identity like other roles. When the user is associated with the synthetic role, that user may be provisioned with the one or more identity management artifacts (e.g., entitlements, roles, groups, etc.) of the synthetic role associated with the federated access provider.

It can thus be understood from a review of that user's identity (e.g., using an interface of the identity management system) that the user has been granted these identity management artifacts associated with the both the federated access provider and the cloud service provider and, importantly, that these access rights (e.g., entitlements of other identity management artifacts) of the cloud service provider can be accessed by the user though the associated identity management artifacts (e.g., entitlement, roles, groups, etc.) of the synthetic role associated with the federated access provider.

Embodiments of identity management systems may also allow a user's activity with respect to the identity management artifacts (e.g., entitlements) associated with the cloud service provider to be determined. Specifically, embodiments of an identity management system may obtain the logs of user activity associated with the enterprise from the cloud service provider. These logs may include a set of events that can be evaluated to determine if the event is associated with an identity maintained at the identity management system and if an event is associated with an identity the event may be stored in association with that identity.

Embodiments may thus provide a number of advantages. As one advantage, embodiments may allow users (e.g., administrators or identity managers or others) to have insight into how identities, roles or other identity management artifacts are associated with federated access through the enterprise's federated access providers, and what entitlements such federated access confers. In particular, the use of federated access in association with cloud computing platforms and their independent IAM structure has created a large visibility gap whereby an enterprise (e.g., administrators or other users within the enterprise) have lost the ability to correlate the access granted with respect to federated systems with entitlements at the cloud based service that the granting of that federated access indirectly provides to those users. Embodiments may thus allow a user to easily ascertain the correlation between roles, entitlements, etc. of a federated server that may be assigned to an identity, and the corresponding entitlements (e.g., access to particular IAM entities at a cloud service provider or other IAM entitlements) that provisioning such federated access grants.

Similarly, by modeling the IAM entities of the cloud service provider as identity management artifacts (e.g., entitlements) according to the model or structure of an identity management system and allowing the correlation of these entitlements for cloud services platforms (e.g., IAM entities) to the identities of an enterprise and to identity management artifacts for federated access (e.g., roles or entitlements associated with a federated access provider), the identity governance systems and the solutions it provides may be extended to implement identity management with respect to cloud services and to provide visibility into identity management across all aspects of an enterprise.

In one embodiment, an identity management system may include a processor and a non-transitory, computer-readable storage medium, including computer instructions for obtaining identity management data from one or more source systems associated with a distributed enterprise computing environment, the identity management data comprising data on a set of identity management artifacts utilized in identity management for the distributed enterprise computing environment. The source systems may include, for example, a federated access provider and a cloud service provider.

The identity management data may be evaluated to determine a set of identities and a set of entitlements associated with the set of identities. This determination may include determining, from the identity management data, an IAM entity entitlement representing a first access right for an IAM entity of the cloud service provider where the IAM entity is associated with the enterprise, and determining a cloud access entitlement associated with the federated access provider, wherein the cloud access entitlement represents a second access right for the IAM entity of the cloud service provider through the federated access provider.

At some point a synthetic role definition comprising a mapping between the IAM entity entitlement and the cloud access entitlement can be received. A synthetic role can be created at the identity management system based on the synthetic role definition, wherein the synthetic role associates the IAM entity entitlement and the cloud access entitlement. This synthetic role may have, for example, a name associated with the IAM entity or IAM entity entitlement. The synthetic role can be assigned to a first identity, whereby assigning the synthetic role to the first identity causes the first identity at the identity management system to be associated with the IAM entity, the cloud access entitlement and the mapping between the IAM entity entitlement and the cloud access entitlement.

Based on the assignment of the synthetic role to the first identity, the identity management system can interact with the federated service provider of the enterprise to provision a native account at the federated service provider associated with the first identity with the cloud access entitlement.

In some embodiments, the cloud access entitlement allows access to the IAM entity at the cloud service provider using single sign on.

In certain embodiments, an event log may be obtained from the cloud service provider, wherein the event log comprises events associated with the IAM entity at the cloud service provider. One or more events of the event log associated with the first identity can be determined and associated with the first identity and the IAM entity entitlement representing the first access right for the IAM entity. In particular embodiments, each event may comprise a unique identifier associated with the first identity each event can be parsed to determine the unique identifier. The first identity can thus be determined to be associated with the unique identifier.

In some cases, the unique identifier is associated with the native account of the first identity at the federated access provider. The unique identifier can be, for example, passed in a Security Assertion Markup Language (SAML) claim between the federated access provider and the cloud service provider when the IAM entity was accessed through the federated service provider using single sign on.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 1A and 1B are a block diagram of a distributed networked computer environment including one embodiment of an identity management system.

FIGS. 3A, 3B, 4A, 4B, 4C, 4D and 5 are examples of interfaces that may be used by embodiments of an identity management system.

DETAILED DESCRIPTION

Figure 1A:
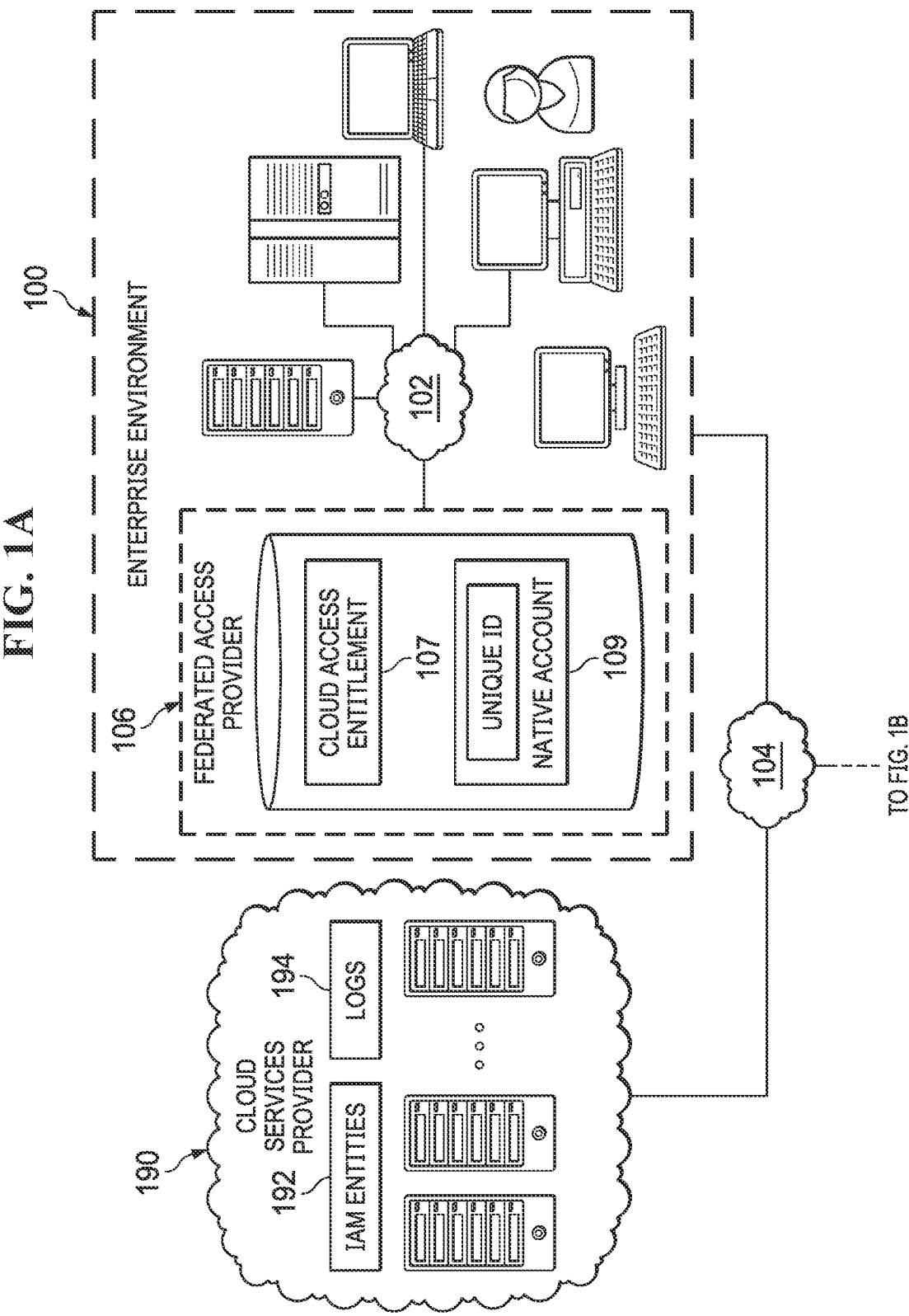

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of particular identity management artifacts (including but not limited to, an identity, entitlement, application, account, role, event, policy, group, permission, user, owner, source, configuration, organization, violation, governance group, access profile or account activity) such that these artifacts may be associated and managed accordingly. For example, an identity may be almost physical or virtual thing, place, person or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with examples of how these identity governance artifacts may be used, each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc. To facilitate the assignment of these entitlements, enterprises may also be provided with the ability to define roles or other identity management artifacts within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity management artifacts using an identity management system, identity governance may be facilitated. For example, by managing the artifacts (e.g., identity or identities, roles, entitlements, etc.) to which users within the enterprise computing environment are assigned, the entitlements or roles to which a user may be assigned (e.g., the functions or access which a user may be allowed) may be controlled. Furthermore, by defining other identity management artifacts, such as more granular access permissions, identity management events or activity may also be determined and evaluated to assess security risk or compliance with identity management policies or rules.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and SOD processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

It would therefore by desirable for identity management solutions to offer the capability for the provisioning of detailed and relevant contextual identity governance information for an enterprise. This desire is prevalent at least because within the IG space today, the best approaches to providing any sort of useful context are manual, ad hoc, and error prone (e.g., not repeatable with consistent outcomes). Increasingly, however, enterprises are moving functionality and sensitive data to the cloud platforms. Identity governance with respect to these cloud-based platforms utilized by an enterprise is challenging.

Often times these cloud services have their own proprietary identity or access management capabilities. For example, AWS employs their Identity and Access Management (IAM), a web service that helps control access to AWS resources. AWS' IAM can be used to control who is authenticated (e.g., signed in) and authorized (e.g., has permissions) to use resources. These cloud platforms thus have their own IAM entities that may be used to manage access, or resources accessible, by users of an enterprise which utilizes the cloud services. Continuing with the above example, AWS employs IAM entities such as Users, Groups, Roles, Inline Policies, Managed Policies, Service Control Policies, etc.

Thus, access to the cloud computing platform may be controlled using the entities (e.g., IAM entities) cloud computing platforms provide. But, from a point of view of the enterprise (and identity governance with respect to that enterprise), the use of cloud computing environments complicates identity governance. These complications stem from a myriad number of sources. First and foremost, each of the cloud computing platforms may have proprietary interfaces (e.g., APIs) for accessing information about the IAM entities associated with an enterprise, including for example, the enterprise's users or accounts on the cloud platform, or logs of the actions taken with respect to those account or users, and furthermore may have different abilities to log such data and different formats for the data they do log.

Another source of complication is that the IAM entities of a cloud computing platform may allow multiple users of the enterprise to be associated with the same IAM entity used to manage access to the cloud computing platform. Thus, for example, AWS may include an IAM user as an entity that can be created in AWS to represent a person or application that uses it to interact with AWS. A user in AWS consists of a name and credentials. An IAM group in AWS is a collection of IAM users. Groups let an administrator specify permissions for multiple users, which can make it easier to manage the permissions for those users. An IAM role in AWS is an IAM identity that has specific permissions. An IAM role has some similarities to an IAM user. IAM roles and users are both AWS identities with permissions policies that determine what the identity can and cannot do in AWS. However, instead of being uniquely associated with one person, a role is intended to be assumable by any user who needs it. Also, a role does not have standard long-term credentials such as a password or access keys associated with it. Instead, when a user assumes a role, temporary security credential is issued for a user's role session. Thus, any user of the enterprise that has an entitlement associated with an IAM user or an IAM role could access the cloud computing platform and perform the actions associated with that IAM user or IAM role with their being very little correlation between the actions performed by the IAM user or IAM role and the user of the enterprise who caused those actions to be performed.

Part and parcel with the complexity of access management implemented by the cloud computing platforms, many enterprises employ federated access services or platforms within their enterprises. As but one example, Active Directory Federation Services (ADFS) may be deployed in association with Active Directory (AD) within the enterprise's network infrastructure. Other examples include Okta or Ping. These federation services may allow a user to access entitlements (e.g., such as systems and applications) located across the enterprises organizational boundaries based upon a single sign on (e.g., a single validation of the users credentials), including access to the IAM entities that may be used to access entitlements associated with the a cloud computing platform employed by the enterprise. Complicating this access pattern even further is that such entitlements may be granted by the federated access service based on the user's association with one or more indirect assignments of entitlements. Thus, for example, a user may be a member of a role or a group such that by signing on though the federated access service, the user is associated with a role or a group, where that role or group has been assigned or granted entitlements which allow members of that role or group to access or utilize various functionality of the cloud computing platform, where this functionality may itself be accessed through an IAM entity (e.g., such as an IAM role or the like) which may allow multiple users to access the same functionality through the same sign-on credentials.

As can be seen then, it may be extremely difficult to track what users within an enterprise have been assigned entitlements with respect to cloud computing platforms and how those entitlements are being utilized with respect to the cloud services platform (e.g., the actions that various users take on those cloud services platform). This difficulty has not, however, staunched the desire to employ identity governance in association with an enterprise's uses of such cloud services platforms. More specifically, users of an IM system may wish to perform identity governance with respect to these cloud service providers and to do so in a similar manner to which they perform identity management with respect to the other aspects of the enterprise.

To those ends, among others, embodiment of an identity management system may provide identity management for cloud services used by an enterprise and, in particular, may provide identity management in association with cloud based services that may be accessed through federated access providers of the enterprise. In particular, the identity management system can store identity management data that may include a set entries, each entry corresponding to an identity management artifact associated with the enterprise. Thus, an identity management system may access federated access providers of the enterprise and cloud services provider that provide cloud services for the enterprise and obtain data on identity management artifacts (e.g., entitlements, groups, etc.) associated with each of federated access providers and cloud services providers. These entitlements can be stored at the identity management system (e.g., according to a model of such identity management artifacts utilized by the identity management system).

The identity management data may include entries on an identity as defined and managed by the identity management system, a list or vector of entitlements, roles or access profiles assigned to that identity by the identity management system or other types of artifacts identity management data. This identity management data for an identity can be stored in a cube (e.g., "Identity Cube") where all identity management data associated with a particular artifact (e.g., for an identity all of their accounts from all data sources, and all attributes and entitlements of those accounts) may be associated. This identity management data for the identity can thus include an identity management artifact (e.g., an entitlement) for a native account at the federated access provider associated with the identity or one or more entitlements associated with the cloud service provider that have been granted to that identity.

The identity management system may provide the ability to generate a synthetic role (e.g., created by the identity management system as opposed to, for example, being derived from data obtained from a source system within the enterprise). In one embodiment, this synthetic role may establish a mapping may be established between a set of identity management artifacts (e.g., entitlements) associated with a federated access provider and a set of artifacts associated with a cloud services provider, were the set of identity management artifacts associated with the federated access provider may be those artifacts (e.g., entitlements, roles, groups, etc.) that grant access to the associated identity management artifacts (e.g., entitlement, etc.) associated with the cloud service provider. In other words, if a user has authenticated with the federated access provider and is granted one of the set of federated access provider artifacts (e.g., entitlements) of the synthetic role, the user may be able to authenticate with the cloud service provider using the single sign on capability of the federated access provider to authenticate with the cloud service provider and access one the mapped artifacts (e.g., entitlements) of the synthetic role associated with the cloud service provider. To aid in assignment or access requests pertinent to this synthetic role, the synthetic role may be given a name that is reflective or otherwise aligned with the name of one or more of the artifacts (e.g., entitlements) of the synthetic role associated with the cloud services provider.

For example, the identity management system may provide an interface whereby users can define a synthetic role select the set of identity management artifacts associated with the federated access provider (e.g., entitlements, roles, groups, etc.) and select the associated artifacts of the cloud service provider (e.g., entitlements, roles, groups, etc.) to which those artifacts associated with the federated access provider grant access. This interface may, for example, allow a user to search by federated access artifacts, and present these identity management artifacts associated with the federated access provider. The interface can also present one or more artifacts associated with the cloud service provider and allow the user to select the one or more artifacts associated with the cloud service provider to be mapped to the selected artifacts associated with the federated access provider to create the mapping for the synthetic role. The interface may also allow the user to define or select a name, where the name may be, for example, reflective or otherwise aligned with the name of one or more of the artifacts (e.g., entitlements) of the synthetic role associated with the cloud services provider.

Once the synthetic role is defined, the identity management system can create that role at the identity management system by defining that role at the identity management system (e.g., according to a model of such identity management artifacts utilized by the identity management system). The synthetic role defines the mapping between the associated one or more identity management artifacts (e.g., entitlements, roles, groups, etc.) associated with the federated access provider and the one or more identity management artifacts (e.g., entitlements, roles, groups, etc.) associated with the cloud service provider. This synthetic role is then just defined as a role according to the model of the identity management system and can thus be requested, assigned, or otherwise management or manipulated by or through the identity management system like any other type of role utilized with the identity management system, including those that originated or were defined based on data from the source systems of the enterprise.

Accordingly, the synthetic role may be assigned to an identity by the identity management system. This assignment may be the result of, for example, an access request submitted by a user for the synthetic role, where that access requests has been approved. Such access requests and approvals (or denials) may be submitted, reviewed and accepted (or declined) through interfaces provided by the identity management system. For example, a user may use a search interface of the identity management system to locate a synthetic role based on an entitlement associated with an entitlement at the cloud service provider that the user wishes to access. This search can be based on the users' knowledge of the name of the entitlement or other role associated with the cloud service provider or a user's listing of entitlements or other artifacts associated with the cloud service provider (or federated access provider). The user may, for example, be able to identify the synthetic role as similar or identical to a desired entitlement associated with the cloud service provider based on the name of the synthetic role, that may be reflective or otherwise aligned with the name of one or more of the artifacts (e.g., entitlements) of the synthetic role associated with the cloud services provider.

When the synthetic role is assigned to an identity (e.g., when an access request for a user for the synthetic role is approved or the synthetic role otherwise assigned), the synthetic role may be associated with the identity (e.g., associated with that user). By virtue of the association of the synthetic role with the identity of the user (e.g., by associating the synthetic role with the Identity Cube for the identity representing that user), the user is thus also associated with both the associated one or more identity management artifacts (e.g., entitlements, roles, groups, etc.) associated with the federated access provider, and the one or more identity management artifacts (e.g., entitlements, roles, groups, etc.) associated with the cloud service provider.

Moreover, when the user is associated with the synthetic role, that user may be provisioned with the one or more identity management artifacts (e.g., entitlements, roles, groups, etc.) associated with the federated access provider. Specifically, if the user has not already been granted these artifacts (e.g., entitlements), the identity management system may access the federated access provider within the enterprise and configure the federated access provider such that the federated access provider will provide access to these entitlements, roles, groups, etc. to that user when the user authenticates with the federated access provider.

It can thus be understood from a review of that user's identity (e.g., using an interface of the identity management system) that the user have been granted these identity management artifacts (e.g., entitlements) associated with the both the federated access provider and the cloud service provider and, importantly, that these access rights (e.g., entitlements of other identity management artifacts) of the cloud service provider can be accessed by the user though the associated identity management artifacts (e.g., entitlement, roles, groups, etc.) of the synthetic role associated with the federated access provider.

Embodiments of identity management systems may also allow a user's activity with respect to the identity management artifacts (e.g., entitlements) associated with the cloud service provider to be determined. In particular, the identity management artifacts (e.g., entitlements) associated with the cloud service provider may represent IAM roles or other entitlements which allow various types of access to be performed in association with the cloud service provider. Additionally, these entitlements (e.g., IAM roles) may be accessed through single sign on by the user through the federated access provider using an entitlement of the federated access provider granted to the user. As such, that particular user's actions or activities with respect to the cloud service provider may be extremely difficult to track or associate with a particular user because of the multiple levels of indirection involved with that user's access.

In order to ameliorate these difficulties, embodiments of an identity management system may obtain the logs of user activity associated with the enterprise from the cloud service provider. These logs (e.g., CloudTrail logs as used by AWS or the like) may include a set of events, where each event may be associated with the IAM entity (e.g., IAM role) that performed the event, the time at which the event was performed, etc. These logs of user activity at the cloud service provider can be parsed at the identity management to determine the individual events included in the log. These events can then be evaluated to determine if the event is associated with an identity maintained at the identity management system and if an event is associated with an identity the event may be stored in association with that identity (e.g., in association with the Identity Cube for the entity). In this manner, not only may entitlements related to the identity be reviewed or ascertained, including entitlements related to IAM entities accessed through entitlements related to the federated access provider, but additionally the user's activity with respect to the entitlements granted to the cloud service provider may be reviewed and evaluated, and moreover the user's activity may be reviewed at a granular level whereby the users actions with respect to particular actions and particular IAM entities may be reviewed and understood.

Specifically, according to certain embodiments, a user associated with the enterprise such as an administrator or the like may configure the federated access entitlements on the federated access provider within the enterprise and may also configure federated access IAM entities at the cloud service provider, such that each of the federated access entitlements on the federated access provider may be configured to allow access to the cloud service provider though at least one of the federated access IAM entities and have the access rights assigned by the administrator to that federated access IAM entity. Thus, if a user authenticates with the federated access provider (e.g., using the user's native account) and has been granted one of these configured federated access entitlements (e.g., through being provisioned with a synthetic role, as discussed, or otherwise), that user may use single sign on to access one of the configured associated federated access IAM entities at the cloud service provider and take actions (e.g., during that session).

In one embodiment, therefore, the federated access provider and federated access IAM entities are configured such that during the single sign on process a unique identifier for the user is passed to the cloud service provider as part of the single sign on process. This unique identifier can, for example, be an identifier associated with the user's native account at the federated access provider. As but one example, the federated access provider and the cloud service provider may be configured to implement single sign on to the IAM entities of the cloud service provider through the federated access provider using Security Assertion Markup Language (SAML) an open standard for exchanging authentication and authorization data between parties, in particular, between an identity provider and a service provider. Thus, when the federated access provider attempts a sign on to a particular IAM entity of the cloud service provider using single sign on, a SAML claim or the like may be exchanged between the federated access provider and the cloud service provider. The cloud service provider may be configured to store attributes, parameters or values (e.g., collectively attributes) of these SAML claims in association with each log which it keeps and may be configured to store logs associated with each IAM entity (e.g., IAM role or account) which may be accessed by the enterprise users (e.g., through the federated access provider).

Accordingly, in one embodiment, the SAML claim that may be exchanged between the federated service provider and the cloud service provider may be configured to include the unique identifier for the user such as the identifier associated with the user's native account at the federated access provider. In one specific embodiment, for example, a name for the session (e.g., the RoleSessionName) to be created using the SAML claim may include the identifier for the user. This name may also include a unique value such as a nonce or Globally Unique Identifier (GUID) such that a unique value can be created from the combination of the identifier and the unique value (e.g., by concatenating the two values). By creating a session name in this manner, a unique session identifier can be created where the unique session identifier includes the unique identifier for the user in a standard manner. Thus, when a session is created in association with a particular IAM role at the cloud service provider, the session is identified by the unique session name (including the unique identifier for the user) and each event logged by the cloud service provider in the logs for that session will include the created session name.

Accordingly, when these logs are obtained from the cloud service provider by the identity management system each event is associated with the IAM entity (e.g., IAM role or account) that performed the event, the time at which the event was performed and the session identifier for the session in which the event occurred. This session identifier includes the unique identifier for the user (e.g., as provided in the SAML claim used to establish the session with the cloud service provider by the federated service provider using the IAM entity). The log can thus be parsed to determine each of the events in the log and the session identifier for each event determined. As the unique identifier for the session was created in the same manner, the session identifier can be parsed to determine the unique identifier for the user associated with the session. This unique identifier for the user can be compared used to locate identity representing that user by, for example, determining the entitlement at the identity management system associated with that unique identifier (e.g., a native account a the federated access provider) and determining which identity has that entitlement. As a native account at the federated access provider is unique to a particular user, this account and the associated identity at the identity management system may represent the user who accessed the cloud service provider during that session using that IAM entity and performed that event. That event may thus be associated with that identity and identity management artifact (e.g., synthetic role or entitlement representing the IAM entity) with which the event is associated. By making such associations, a user's activity may be tracked and reviewed at a very granular level, allowing not only insight into which users access which IAM entities, but more specifically, what users performed what events using what IAM entities through what federated access entitlements at what time, among other detailed information.

Embodiment of such identity management systems will now be discussed in more detail. Turning then to FIGS. 1A and 1B, then, a distributed networked computer environment including one embodiment of such an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application-based users, etc. associated with enterprise 100.

Generally then, users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles in enterprise environment 100 which may shift, change, evolve, etc. leaving entitlements non optimally distributed among various users.

These access risks may be particularly difficult to manage in association with certain resources utilized by the enterprise 100. For example, enterprise 100 may make used of cloud service provider 190 for various functionality. Cloud based computing service 190 provides virtualized computing resources (e.g., compute power, database storage, content delivery, etc.) over a network (often times the Internet) and may include the provisioning of Infrastructure as a Service (IaaS), Software as a Service (SaaS) or Platform as a Service (PaaS). Examples of cloud-based computing platform include Amazon Web Services (AWS), Amazon Elastic Compute Cloud (EC2), the Google Cloud Platform, Microsoft's Azure, etc.

Often times these cloud services 190 have their own proprietary identity or access management capabilities. For example, AWS employs their Identity and Access Management (IAM), a web service that helps control access to AWS resources. AWS' IAM can be used to control who is authenticated (e.g., signed in) and authorized (e.g., has permissions) to use resources. These cloud platforms thus have their own IAM entities 192 that may be used to manage access, or resources accessible, by users of an enterprise 100 which utilizes the cloud services 190. Continuing with the above example, AWS employs IAM entities such as Users, Groups, Roles, Inline Policies, Managed Policies, Service Control Policies, etc.

It will be noted here that these entities may be referred to distinctly from the identity management artifacts used in embodiments as disclosed herein. Thus, for purpose of reference these cloud computing platform management entities may be referred to without loss of generality by prefacing them with a Cloud Computing (CC) or Identity and Access Management (IAM) prefix without loss of generality. Accordingly, for example, a role as used with embodiments of an identity management system may be referred to distinctly from an IAM role (e.g., though a role may represent an IAM role, an identity may represent an IAM user, etc.). Moreover, it should be understood that while AWS and IAM and associated entities may be utilized as examples herein and embodiments described in association with such examples, these examples are but one example of a cloud computing platform 190, and entities for such access management in association with a cloud computing platform, and should be understood to be used as examples of such without loss of generality as to the applicability of embodiments as disclosed to different or other cloud computing platforms and their associated access management entities.

Another of the resources that may be utilized by the enterprise 100 is federated access provider 106. As but one example, Active Directory Federation Services (ADFS) may be deployed in association with Active Directory (AD) as a federated access provider 106 within the enterprise 100. Other examples include Okta or Ping. A user may have a native account 109 with the federated access provider 106 whereby the user may be authenticated by the federated access provider 106 using the native account 109. This federated access provider 106 may also include federation services that allow a user within the enterprise to access entitlements (e.g., such as systems and applications) located across the enterprises organizational boundaries based upon a single sign on (e.g., a single validation of the users credentials using the user's native account 109), including access to the IAM entities that may be used to access entitlements associated with the a cloud computing platform 190 employed by the enterprise 100. Complicating this access pattern even further is that such entitlements may be granted by the federated access service 106 based on the user's association with one or more indirect assignments of entitlements 107 that allow access to one or more associated IAM entities of the cloud service provider 190 (referred to as cloud access entitlements or cloud entitlements). Thus, for example, a user may be a member of a role or a group such that by signing on though the federated access service 106, the user is associated with a group or other entitlement, where that group has been assigned or granted entitlements which allow members of that group to access or utilize various functionality of the cloud computing platform 190, where this functionality may itself be accessed through an IAM entity 192 (e.g., such as an IAM role or the like) which may allow multiple users to access the same functionality through the same sign-on credentials.

Thus, access to the cloud computing platform may be controlled using the entities (e.g., IAM) entities 192 cloud computing platforms 190 provide. But, from a point of view of the enterprise (and identity governance with respect to that enterprise), the use of cloud computing environments 190 complicates identity governance. These complications stem from a myriad number of sources. First and foremost, each of the cloud computing platform 190 may have proprietary interfaces (e.g., APIs) for accessing information about the IAM entities associated with an enterprise, including for example, the enterprise's users or accounts on the cloud platform, or logs of the actions taken with respect to those account or users, and furthermore may have different abilities to log such data and different formats for the data they do log.

Another source of complication is that the IAM entities 192 of a cloud computing platform may allow multiple users of the enterprise 100 to be associated with the same IAM entity used to manage access to the cloud computing platform 190. Thus, for example, AWS may include an IAM user as an entity that can be created in AWS to represent a person or application that uses it to interact with AWS. A user in AWS consists of a name and credentials. An IAM group in AWS is a collection of IAM users. Groups let an administrator specify permissions for multiple users, which can make it easier to manage the permissions for those users. An IAM role in AWS is an IAM identity that has specific permissions. An IAM role has some similarities to an IAM user. IAM roles and users are both AWS identities with permissions policies that determine what the identity can and cannot do in AWS. However, instead of being uniquely associated with one person, an IAM role is intended to be assumable by any user who needs it. Also, an IAM role does not have standard long-term credentials such as a password or access keys associated with it. Instead, when a user assumes an IAM role, temporary security credential is issued for a user's role session. Thus, any user of the enterprise 100 that has an entitlement associated with an IAM user or an IAM role could access the cloud computing platform 190 and perform the actions associated with that IAM user or IAM role with their being very little correlation between the actions performed by the IAM user or IAM role and the user of the enterprise who caused those actions to be performed. The use of federated access provider 106 also complicates such identity governance by allowing indirect access to such IAM entities 192.

As can be seen then, it may be extremely difficult to track what users within an enterprise have been assigned entitlements with respect to cloud computing platforms 190 or other resources of an enterprise 100 and, in particular, how those entitlements are being utilized with respect to the cloud services platform 190 (e.g., the actions that various users take on those cloud services platform 190). This difficulty has not, however, staunched the desire to employ identity governance in association with an enterprise's uses of such cloud services platforms. More specifically, users may wish to perform identity governance with respect to these cloud service providers 190 and to do so in a similar manner to which they perform identity management with respect to the other aspects of the enterprise.

To assist in managing the artifacts (e.g., identity, entitlement, roles, groups, etc.) assigned to various users and more generally in managing and assessing access risks in enterprise environment 100, identity management system 150 may be employed. Such an identity management system 150 may allow an administrative or other type of user to define one or more identity management artifacts such as an identity, entitlement, role, event, access profile or account activity, and associate these defined identity management artifacts using, for example, an administrator interface 152. These definitions 159 for the identity management artifacts are stored at the identity management system 150 according to a model definition used by the identity management system 150. For example, defined identities may be associated with entitlements or roles. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may be the same as, or different than, network 102), it will be realized that such an identity management system 150 may be deployed as part of the enterprise environment 100, remotely from the enterprise environment, as a cloud based application or set of services, or in another configuration.

It may be helpful to illustrate some examples of identity management artifacts and their usage. As one example, an identity may thus be almost physical or virtual thing, place, person or other item that an enterprise would like to define. Thus, an identity may be an individual or group of users or humans, employees, a virtual entity like a sensor or a robot, an account and may include capacity, title, groups, processes, physical locations, or almost any other physical or virtual thing, place, person or other item. In one embodiment, an Identity may be an authoritative account that includes a first name, a last name and an email address. As another example, an entitlement may be the ability to perform or access a function within the distributed networked enterprise computer environment 100 or the resources utilized by the enterprise (such as cloud service provider 190), including, for example, accessing computing systems, applications, file systems, physical locations, particular data or data items, networks, subnetworks or network locations, etc. Entitlements may also define the actions a user can take with respect to that access. Each of these identities may therefore be assigned zero or more entitlements with respect to the distributed networked computer environments.

Another example of an identity management artifact may be a role. Roles may be used to facilitate the assignment of these entitlements. Thus, enterprises may also be provided with the ability to define roles through the identity management system 150. A role within the context of the identity management system 150 may be a collection of entitlements, or access profiles, that may span different source systems. These roles may be assigned a name or identifiers (e.g., manager, engineer, team leader) by an enterprise that designate the type of user or identity that should be assigned such a role. By assigning a role to an identity or group of identities using the identity management system 150, the identity may be assigned the corresponding collection of entitlements or access items associated with the assigned role. Similarly, enterprises may also be provided with the ability to define access profiles. An access profile may be a set of entitlements that represent a level of logical access (e.g., user, guest, administrator, etc.) to a source or applications.

Connectors 156 of the identity management system 150 may thus request or otherwise obtain data from various touchpoint (or source) systems within, or external to, enterprise environment 100 to obtain identity management data 154. Each connector 156 may, for example, be configured to utilize an interface provided by a respective source system associated with the enterprise 100 to obtain identity management data associated with that source system. These source systems may include, for example federated access provider 106, Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite. These connectors 156 may also be configured with the ability to provision one or more access or other types of rights with respect to an associated source system. Thus, for example, a connector 156 may be configured to access a corresponding source system associated with the enterprise 100 and provision a user with an account, associate a user with a group, allow access rights to data, etc.

As but one specific example, a connector 156a associated with federated access provider 106 may be configured to access the federated access provider 106 and obtain data on accounts for a user such that those accounts can be represented as an identity management artifact in identity management data 154. Such accounts may include a user's native account 109 at the federated service provider 106, including a unique identifier for that native account 109. The connector 156a may additionally obtain data on access rights (also referred to as cloud access entitlements 197) associated with the federated access provider 106 that grant access to an IAM entity of the cloud service provider 190 so these access rights can be represented as an identity management artifact (e.g., entitlement) in identity management data 154. These identity management artifacts will be referred to as cloud access entitlements 107 without loss of generality. Connector 156a may also be configured to provision one or more access or other types of rights with respect to the federated access provider 106 by, for example, associating a user (e.g., a native user's account 109) with an account or an access entitlement such as a cloud access entitlement 197 that would allow a user to be authenticated via his native account 109 and access cloud service provider through one or more IAM entities 192 using single sign on based on the cloud entitlement 107 provisioned for the user.

As another example, a connector 156b associated with cloud service provider 190 may be configured to access the cloud service provider 190 and obtain data on IAM entities untitled by the enterprise to access or otherwise manage access with respect to cloud service provider 190 such that those IAM entities (e.g., IAM role, etc.) can be represented as an identity management artifact (e.g., entitlement) in identity management data 154. An identity management artifact that represents an access right granted to a IAM entity will be referred to as IAM entity entitlement 196 without loss of generality. Connector 156b may also be configured to provision one or more access or other types of rights with respect to an IAM entity at cloud service provider 190.

The identity management system 150 can thus store identity management data 154 (such as identity management data obtained through connectors 156 or otherwise) in an identity management data store 155. This identity management data store 155 may be, for example, a relational data store, including SQL based data stores such as a MySQL database or the like. The identity management data 154 stored may include a set of entries, each entry corresponding to an identity management artifact as discussed. For example, the identity management data 154 may include entries on an identity (e.g., alphanumerical identifiers for identities) as defined and managed by the identity management system, a list or vector of entitlements, roles or access profiles assigned to that identity by the identity management system or other types of artifacts. A time stamp at which the identity management data was collected (e.g., from a source system) may be associated with the data for a particular artifact. Other data could also be associated with each artifact, including data that may be provided from other systems such as a title, location or department associated with the identity.

As another example, the identity management data 154 may also include entries corresponding to entitlements or roles, where each entry for a role may include the role identifier (e.g., alphanumerical identifier or name for the role) and a list or vector of the entitlements associated with each role. Other data could also be associated with each role, such as a title, location or department associated with the role. Moreover, the identity management data 154 may also include event data collected from various systems within the enterprise environment 100 that is associated with the identities defined in the identity management data 154 through the evaluation or analysis of these events or other data in an identity management context. A user may interact with the identity management system 150 through a user interface 158 to access or manipulate data on identities, roles, entitlements, events or generally perform identity management with respect to enterprise environment 100.

In one embodiment, the identity management data 154 for an artifacts (e.g., identity) can be stored in a "cube" (e.g., "Identity Cube") where all identity management data 154 associated with a particular artifact (e.g., for an identity all of their accounts from all data sources, and all attributes and entitlements of those accounts) may be associated. Thus, the term Identity Cube herein will be understood to mean a collection of information associated with an identity. In one embodiment, therefore, an Identity Cube 153 for a user may include that user's native account 151 at the federated service provider 109 (e.g., as obtained by an associated connector 156a from the federated service provider 109). The native account 151 can be represented, for example, by an entitlement artifact for the account associated with the user's Identity Cube 153, where that entitlement artifact references the unique identifier 142 of that user's native account with the federate access provider.

As part of a robust identity management system, it may also be desirable to effectively search the identity management data 154 associated with an enterprise 100 including the identities and their entitlements. Specifically, it is desired to provide an identity management system with effective ways to store, index and search such identity management data to increase the efficacy of search of identity management data at least by speeding the searching of such identity management data and improving the results of this searching. Identity management system 150 may thus include search system 160 having an identity management document store 162. This identity management document store (or just document store) 162 may, in one embodiment, be a NoSQL data store designed to index, store, access, retrieve and search documents 161 such as, for example, Elasticsearch, MongoDB, Azure Cosmos or the like. The document store 162 may thus include an interface (e.g., a Representational State Transfer (REST) API or the like) whereby requests for the indexing, access or searching of documents 161 may be sent through the interface.

Search system 160 may store data included in, or derived from, identity management data 154 in the document store 162 using such an interface. Specifically, in certain embodiments, the search system 160 may be in communication with a sync pipeline 164. The sync pipeline 164 may access the identity management data 154 and evaluate the identity management data 154 of the relational data store to transform the identity management data 154 stored therein into documents according to a denormalized document model for identity management artifacts. The sync pipeline 164 can then generate messages for indexing and storing these documents in the document store 162 and send the indexing messages to the search service 160 either atomically or in bulk.

In one embodiment, sync pipeline 164 may include an aggregator 165. The aggregator 165 may at some time interval, receive updates from, or query, the identity management data store 154 to identify which artifacts have been created, updated, and deleted. The aggregator 165 can also query the identity management data 154 to determine data associated with those artifacts. Additionally, the sync pipeline 164 may include a sync interface 167 through which indexing messages (e.g., events) may be received from various services 170 employed by the identity management system 150 (e.g., when those services have data they wish to be indexed in documents 161 in document store 162). Based on the artifacts the sync pipeline assembles a sync message (e.g., a indexing message) for one or more artifacts (e.g., a message for creating, updating or deleting a document 161 corresponding to that artifact in the document store 162). In one embodiment, the aggregator 165 may serve to buffer, merge or orchestrate determined data, received indexing messages or the sending of sync messages such that requests (e.g., sync or indexing messages) to the other components (e.g., the document store 162) of the identity management system may be efficiently dispatched while still maintaining substantially real-time updates to the documents 161 in the document store 162.

These indexing messages can be received by the document store 162 and used to index the data for documents 161 for the identity management artifacts in the data store 162. The documents 161 in the data store may thus represent the identity management artifacts of the enterprise 100 according to a nested denormalized document model. There may thus be a document for each artifact (e.g., identity, entitlement, role, event, access profile, account activity, etc.) associated with the enterprise environment 100. In certain embodiments, these documents formed according to the data model may be nested documents whereby a document for an identity management artifact (e.g., such as an identity, role, event, etc.) may include, as a nested or child document, documents for related identity management artifacts, even in instances where documents for those related identity management artifacts may be separately stored and indexed in the document data store 162 (e.g., as top level, root, or parent documents).

As an example of identity management data that may be obtained from an identity management system, the following is one example of a JavaScript Object Notation (JSON) object that may relate to an identity:

```
{
  "attributes": {
    "Department": "Finance",
    "costcenter": "[R01e, L03]",
    "displayName": "Catherine Simmons",
    "email": "Catherine.Simmons@demoexample.com"
    "empid": "1b2c3d",
    "firstname": "Catherine",
    "inactive": "false",
    "jobtitle": "Treasury Analyst",
    "lastname": "Simmons",
    "location": "London",
    "manager": "Amanda.Ross",
    "region": "Europe",
    "riskScore": 528,
    "startDate": "12/31/2016 00:00:00AM UTC",
    "nativeIdentity_source_2": "source_2",
    "awesome_attribute_source_1": "source_1",
    "twin_attribute_a": "twin a",
    "twin_attribute_b": "twin b",
    "twin_attribute_c": "twin c"
  },
  "id": "2c9084ee5a8de328015a8de370100082",
  "integration_id": "iiq",
  "customer_id": "ida-bali".
  "meta": {
    "created": "2017-03-02T07:19:37.233Z",
    "modified": "2017-03-02T07:24:12.0242"
  },
```

-continued

```
"name": "Catherine.Simmons",
"refs": {
  "accounts": {
    "id": [
      "2c9084ee5a8de328015a8de370110083"
    ],
    "type": "account"
  },
  "tags": [
    {
      "id": "2c9084ee5a8ad545345345a8de370110083"
      "name": "SOD-SOX",
      "type": "TAG"
    },
    {
      "id": "2c9084ee5a8ad545345345a8de3701 22093"
      "name": "PrivilegedAccess",
      "type": "TAG"
    },
  "entitlements": {
    "id": [
      "2c9084ee5a8de328015a8de449060e54",
      "2c9084ee5a8de328015a8de449060e55"
    ],
    "type": "entitlement"
  },
  "manager": {
    "id": [
      "2c9084ee5a8de022015a8de0c52b031d"
    ],
    "type": "identity"
  }
},
"type": "identity"
}
```

As another example of identity management data that may be obtained from an identity management system, the following is one example of a JSON object that may relate to an entitlement:

```
{
"integration_id": "bd992e37-bbe7-45ae-bbbf-c97a59194cbc"
"refs": {
  "application": {
    "id": [
      "2c948083616ca13a01616ca1d4aa0301"
    ],
    "type": "application"
  }
},
"tags": [
  {
    "id": "2c9084ee5a8ad545345345a8de370110083"
    "name": "SOD-SOX",
    "type": "TAG"
  },
  {
    "id": "2c9084ee5a8ad545345345a8de370122093"
    "name": "PrivilegedAccess",
    "type": "TAG"
  },
]
"meta": {
  "created": "2018-02-06T19:40:08.0052",
  "modified": "2018-02-06T19:40:08.018Z"
},
"name": "Domain Administrators",
"attributes": {
  "description": "Domain Administrators group on Active Directory"
  "attribute": "memberOf",
  "aggregated": true,
  "requestable": true,
  "type": "group",
  "value": "cn=Domain Administrators,dc=domain,dc=local"
},
```

```
"id": "2c948083616ca13a01616ca1f1c50377",
"type": "entitlement",
"customer_id": "3a60b474-4f43-4523-83d1-eb0fd571828f"
}
```

Other examples are presented in the attached Appendix.

Search system 160 may thus offer an interface 168 through which the documents in the data store 162 may be queried. This interface may allow queries to be submitted where the queries may be formulated according to a search query string syntax that allows the querying of nested documents (or data in nested documents) of the data store 162. The interface 168 may also allow "free text" search queries to be submitted, thus allowing for searching the documents in the data store 162 without prior knowledge about which field or fields to look in, or even what fields the documents may contain. Moreover, the interface 168 may offer the ability for the user to save such search queries such that they may be executed at a later point or at some time interval to return results or, for example, to raise a notification or an alarm, or for proactive governance actions on query results.

As can be seen then, embodiments of an identity management system may be utilized to effectively perform identity governance in association with enterprise 100. However, this identity governance with respect to cloud based service provider 190 may be quite complex. As has been discussed, the IAM entities of cloud computing platform 190 may allow multiple users of the enterprise 100 to be associated with the same IAM entity used to manage access to the cloud computing platform 190. As an example, in the case of AWS being cloud service provider 190, an IAM role is intended to be assumable by any user needs it. Also, a role does not have standard long-term credentials such as a password or access keys associated with it. Instead, when a user assumes a role, temporary security credential is issued for a user's role session. Thus, any user of the enterprise that has an entitlement associated with an IAM role could access the cloud computing platform 190 and perform the actions, with their being very little correlation between the actions performed by the IAM role and the user of the enterprise 100 who caused those actions to be performed.

Additionally, a user may be associated with one or more cloud entitlements 107 at the federated access provider 106 such that the user is permitted to access the cloud service provider 190 using the cloud entitlement 107 through single sign on functionality whereby the user authenticates with the federated access provider 106 using the user's native account 109 at the federated access provider 106 and the user can access an IAM entity at the cloud service provider 190 through the cloud entitlement 107. These cloud entitlements 107 may, for example include the association of the user with a particular group (e.g., an Active Directory group) or another association at the federated service provider 106 which grants such entitlements. Thus, it may be extremely difficult to ascertain that a user has been given access rights to the cloud service provider 190 as these access rights are assigned indirectly through the federated access provider 106 by the association of the user's native account 109 with one or more cloud entitlements 107 provided by the federated access provider 106. Moreover, as many users may be provisioned with the same the cloud entitlements 107, these users may all access the same IAM entity using substantially the same credentials. Thus, it may also be extremely difficult to ascertain which user's access which IAM entity. As such, identity governance with respect to managing what users within an enterprise have been assigned entitlements with respect to cloud services platform 190 and how those entitlements are being utilized with respect to the cloud services platform 190 (e.g., the actions that various users take on those cloud services platform) is a complex task.

Accordingly, to implement such identity governance with respect to cloud computing platform 190 in association with federated access provider 106, embodiments of identity management system 150 include cloud identity manager 180. Cloud identity manager 180 may provide the ability to generate a synthetic role 157 (e.g., created by the identity management system as opposed to, for example, being derived from data obtained from a source system within the enterprise 100). This synthetic role 157 may be defined as one of the identity management artifacts defined in the identity management artifacts definitions 159. In one embodiment, this synthetic role 157 may establish a mapping between a set of identity management artifacts (e.g., entitlements, groups, roles, etc. where cloud access entitlements 107 will be used as an example in the following discussion without loss of generality) associated with a federated access provider 106 and a set of artifacts associated with a cloud services provider 190 (here IAM entity entitlements 196 will be used as an example without of generality), where the set of cloud access entitlements 107 associated with the federated access provider 106 may represent those cloud access entitlements 197 at the federated access provider 106 that grant access to the IAM entities 192 (represented by IAM entity entitlements 196) associated with the cloud service provider. In other words, if a user has authenticated with the federated access provider 106 and is granted one of the set of cloud access entitlements 107 associated with the synthetic role 157, the user may be able to authenticate with the cloud service provider 190 using the single sign on capability of the federated access provider 106 to authenticate with the cloud service provider 190 and access one the mapped IAM entity entitlements 196 of the synthetic role 157 associated with the cloud service provider 190. To aid in assignment or access requests pertinent to this synthetic role 157, the synthetic role 157 may be given a name that is reflective or otherwise aligned with the name of one or more of the IAM entity entitlements 196 of the synthetic role 157 associated with the cloud services provider 190.

For example, the cloud identity manager 180 may provide an interface 181 whereby users can define a synthetic role 157 by selecting a cloud access entitlements 107 associated with the federated access provider 106 and selecting one or more IAM entity entitlements 196 associated with the cloud service provider 190 to which those cloud access entitlements 107 grant access. This interface 181 may, for example, allow a user to search by federated access artifacts, and present identity management artifacts associated with the federated access provider 106. The interface 181 can also present one or more artifacts (e.g., IAM entity entitlements 196) associated with the cloud service provider 190 and allow the user to select IAM entity entitlements 196 associated with the cloud service provider 190 to be mapped to the selected cloud access entitlements 107 associated with the federated access provider 106 to create and store a synthetic role definition 183 defining the mapping for synthetic role. The interface 181 may also allow the user to define or select a name for the synthetic role, where the name may be, for example, reflective or otherwise aligned with the name of one or more of the IAM entity entitlements 196 of the synthetic role associated with the cloud services provider. This name may also be associated with the synthetic role definition 183.

Once the synthetic role definition 183 is established, the cloud identity manager 180 can create that role at the identity management system 150 by defining the synthetic role 157 according to that synthetic role definition 183 at the identity management system 150 (e.g., according to a model of such identity management artifacts utilized by the identity management system 150). Specifically, in one embodiment, the cloud identity manager 180 may include a synthetic role integrator 185 that may, at some time interval (hourly, daily, weekly, etc.) evaluate each synthetic role definition 183 against the roles defined in the identity management artifacts definition 159 to synchronize the definitions of the synthetic roles 183 as maintained by the cloud identity manager 180 with the defined role as defined in the identity management artifacts definition 159. Thus, existing synthetic roles 157 may be updated to reflect the current state of the synthetic role definition 183 or new synthetic roles corresponding to a synthetic role definition 183 may be defined in the identity management artifacts definition 159.

These synthetic roles 157 are thus roles the include the mapping between the IAM entity entitlements 196 associated with the cloud service provider 190 and the cloud access entitlements 107 associated with the federated access provider 106. Accordingly, the synthetic role 157 is defined as a role according to the model of the identity management system 150 and can thus be requested, assigned, or otherwise managed or manipulated by, or through, the identity management system 150 like any other type of role utilized with the identity management system 150, including those that originated or were defined based on data from the source systems of the enterprise 100.

As such, a synthetic role 157 may be assigned to an identity by the identity management system. This assignment may be the result of, for example, an access request submitted by a user for the synthetic role 157, where that access requests has been approved. Such access requests and approvals (or denials) may be submitted, reviewed and accepted (or declined) through interfaces 158 provided by the identity management system 150. For example, a user may use a search interface 168 of the identity management system 150 to locate a synthetic role 157 based on an entitlement associated at the cloud service provider 190 that the user wishes to access. This search can be based on the users' knowledge of the name of the IAM entity or other entitlement associated with the cloud service provider 190, or a user's listing of entitlements or other artifacts associated with the cloud service provider 190 (or federated access provider 106). The user may, for example, be able to identify the synthetic role 157 as similar or identical to a desired entitlement associated with the cloud service provider 190 based on the name of the synthetic role, that may be reflective or otherwise aligned with the name of one or more of the IAM entity entitlements 196 of the synthetic role 157 associated with the cloud services provider 190.

When the synthetic role 157 is assigned to an identity (e.g., when an access request for a user for the synthetic role is approved or the synthetic role otherwise assigned), the synthetic role 157 may be associated with the identity (e.g., associated with that user). In particular, the synthetic role 157 may be assigned to the identity representing the user by associating the synthetic role 157 (e.g., an alphanumeric identifier or the like of the synthetic role 157) with the Identity Cube 153 for that user's identity. By virtue of the association of the synthetic role 157 with the identity of the user (e.g., by associating the synthetic role 157 with the Identity Cube 153 for the identity representing that user), the user is thus also associated with both the one or more cloud access entitlements 107 associated with the federated access provider 106, and the one or more IAM entity entitlements 196 associated with the cloud service provider 190. In this manner, the identity management system is now "aware" (e.g., incudes data representing) that the user has both the cloud access entitlements 107 offered by the federated access provider 106 and that the user may access the IAM entities 192 of the cloud service provider 190 represented by the IAM entity entitlements 196.

Moreover, when the user is associated with the synthetic role 157, that user may be provisioned with one or more cloud access entitlements 107 of the synthetic role 157 associated with the federated access provider 106. Specifically, when the user is assigned the synthetic role 157 the identity management system 150 can access the Identity Cube 153 for the user to determine if the user already has access to these cloud access entitlements 107 (e.g., if these cloud access entitlements 107 are already associated with the Identity Cube 153 for the user). If the user has not already been granted these cloud access entitlements 107 with respect to federated access provider 106, the identity management system 150 may access the federated access provider 106 through connector 156a associated with the federated access provider 106 to configure the federated access provider 106 such that the federated access provider will provide access to those cloud based entitlements 197 to the user when the user authenticates with the federated access provider 106 (e.g. using their native account 109).

Thus, by using a synthetic role 157, and by virtue of the assignment of the synthetic role 157 to the Identity Cube 153 of a user, a wealth of information may be ascertained or utilized by the identity management system 150 or its users. For example, by using interface 158 or 152 it can be understood from a review of that user's identity that the user has been granted these cloud access entitlements 107 associated with the both the federated access provider 106 and the cloud service provider 190 and, importantly, that associated IAM entities 192 can be accessed by the user though these cloud access entitlements 107. Such information may be useful in granting or assigning entitlements, or a review of assigned entitlements, such as in a certification campaign, as these synthetic roles 157 may allow an administrator or other user to view not only the synthetic role 157 associated with a user, but additionally the cloud access entitlements 107 the user has, along with the associated IAM entity entitlements 196 that these cloud access entitlements 107 of the federated access provider 106 allows a user to access. In this manner, not only can the full scope of a user's entitlement set be ascertained, but additionally the avenues by which that user can utilize such entitlements may be comprehended as well.

In many cases, however, users of identity management system 150 may not only desire to assess the entitlements or other identity management artifacts associated with an identity (e.g., user), but may also desired to determine how a user actually uses their entitlements, and in particular how they utilize their entitlements related to the cloud service provider 190. Embodiments of identity management system 150 may thus also allow a user's activity with respect to the identity management artifacts (e.g., entitlements) associated with the cloud service provider to be determined. In many cases, the cloud service provider 190 may maintain logs 194 of the various events that occurred with respect to a session or other access initiated using an IAM entity 192. For example, AWS may maintain CloudTrail logs that records event history and activity for users that access AWS through an IAM entity. The data that these logs include for each event may often times be configurable by the enterprise 100 in association with the IAM entities 192 used to access the cloud service provider 190 by that enterprise. Continuing with the example of AWS, the logs 194 of the cloud service provider 190 may be configured to include operations performed on or within a resource including operations such as Amazon S3 object level APIs and AWS Lambda function invoke APIs. For example, API actions on Amazon S3 objects can be logged as events and include detailed information such as the AWS account, IAM role, and IP address of the caller, time of the API call, or other details. Activity of Lambda functions and details on Lambda function executions may also be recorded in events, including the IAM entity 192 or service that made the Invoke API call, when the call was made, and which function was executed.

As can be seen a wider variety of valuable data regarding the use of cloud service provider 190 by the enterprise 100 and the users of the enterprise may be recorded by the cloud service provider 190 in logs 194. It is difficult, however, to correlate such events to the identities (e.g., users) that initiated such events at the cloud service provider 190. In particular, as discussed above, IAM entity entitlements 196 associated with the cloud service provider 190 may represent IAM roles or other IAM entities 192 which allow various types of access to be performed in association with the cloud service provider 190. Additionally, these IAM entities 192 may be accessed through single sign on by the user through the federated access provider 106 using a cloud access entitlement 197 of federated access provider 106 granted to the user. As such, that particular user's actions or activities with respect to the cloud service provider 190 and recorded in the logs 194 may be extremely difficult to track or associate with the user's because of the multiple levels of indirection involved with that user's access to the cloud service provider 190.

In order to ameliorate these difficulties, embodiments of cloud identity manager 180 may include log processor 144 that obtains the event logs 194 associated with the enterprise 100 from the cloud service provider 190 through connector 182 and stores these cloud service provider logs 194 at the identity management system 150. These logs 194 may be obtained at some time intervals, such as nightly, weekly, hourly or at some other time interval). These logs 194 (e.g., CloudTrail logs as used by AWS or the like) may include a set of events, where each event may be associated with the IAM entity 192 that performed the event, the time at which the event was performed, etc. Log processor 144 parses the logs 194 of user activity to determine the individual events included in the log. These events can then be evaluated by the log processor 144 to determine if the event is associated with an identity maintained at the identity management system 150 and if an event is associated with an identity the event may be stored in association with the Identity Cube 153 for that identity. In this manner, the user's activity with respect to the IAM entity entitlements 196 granted to the user for the cloud service provider 190 may be reviewed and evaluated, and moreover the user's activity may be reviewed at a granular level whereby the users actions with respect to particular actions and particular IAM entities 192 may be reviewed and understood.

Specifically, according to certain embodiments, a user associated with the enterprise such as an administrator or the like may configure cloud access entitlement 107 on the federated access provider 106 within the enterprise 100 and may also configure IAM entities 192 at the cloud service provider 190 that may be accessed through cloud access entitlements 107, such that each of the cloud access entitlement 107 on the federated access provider 106 may be configured to allow access to the cloud service provider 190 though at least one of the IAM entities 192 and have the access rights assigned that federated access IAM entity 192. Thus, if a user authenticates with the federated access provider 106 (e.g., using the user's native account 109) and has been granted one of these configured cloud access entitlement 107 (e.g., through being provisioned with a synthetic role 157, as discussed, or otherwise), that user may use single sign on to access one of the configured associated federated access IAM entities 192 at the cloud service provider and take actions (e.g., during that session). The Identity Cube 153 for such a user may reflect both the cloud access entitlements 107 that a user may access at the federated access provider 190 (e.g. through single sign on) and the IAM entities 192 that may be access through such cloud access entitlements 107 (e.g., as represented by the IAM entity entitlements 196 associated with the Identity Cube 153. Such a configuration may be accomplished, in one embodiment, through the use of synthetic roles 157 as discussed above.

Therefore, in one embodiment, the federated access provider 190 and federated access IAM entities 192 are configured such that during the single sign on process a unique identifier for a user is passed to the cloud service provider 190 as part of the single sign on process for the IAM entity 192 through the federated access provider 106. This unique identifier can, for example, be an identifier associated with the user's native account 109 at the federated access provider 106. As but one example, the federated access provider 106 and the cloud service provider 190 may be configured to implement single sign on to the IAM entities 192 of the cloud service provider through the federated access provider using Security Assertion Markup Language (SAML), an open standard for exchanging authentication and authorization data between parties and, in particular, between an identity provider and a service provider. Thus, when the federated access provider 190 attempts a sign on to a particular IAM entity 192 of the cloud service provider using single sign on, a SAML claim or the like may be exchanged between the federated access provider 106 and the cloud service provider 190. As part of the configuration of the storage of the event logs (or other configuration of the cloud service provider 190) the cloud service provider 190 may be configured to store attributes, parameters or values (e.g., collectively attributes) of this SAML claim in association with each log 194 (and with each event recorded in each log 194) which it keeps and may be configured to store logs associated with each IAM entity 192 which may be accessed by the enterprise users (e.g., through the federated access provider 106).

Accordingly, in one embodiment, the SAML claim that may be exchanged between the federated service provider 106 and the cloud service provider 190 may be configured to include the unique identifier for the user using the cloud access entitlement 107 to access the cloud service provider 190, such as the identifier associated with the user's native account 109 at the federated access provider 106. In one specific embodiment, for example, a user name (e.g., userName) or a name for the session (e.g., the RoleSessionName) to be created at the cloud service provider 190 using the SAML claim from the federated access provider 106 may include the identifier for the user. This (e.g., session) name may also include a unique value such as a nonce or Globally Unique Identifier (GUID) such that a unique value can be created from the combination of the identifier and the unique value (e.g., by concatenating the two values). By creating a session name in this manner, a unique session identifier can be created where the unique session identifier includes the unique identifier for the user in a standard manner. Thus, when a session is created in association with a particular IAM entity 192 at the cloud service provider 190, the session is identified by the unique session name (including the unique identifier for the user) and each event logged by the cloud service provider 190 in the logs 194 for that session will include the created session name passed in the SAML claim. Additionally, as has been described the logs 194 may be configured to include other data in each event, including for example the IAM entity 192 that initiated the event or the cloud access entitlement 197 used to access the IAM entity 192. For example, the logs 194 may include an event for assuming an IAM entity 192 and a set of events delimiting what that IAM entity 192 did during that session.

To illustrate in more detail, a cloud service provider 190 such as AWS may expect certain attributes in the SAML claim, including, for example, a NameID or a RoleSessionName. In one embodiment, the NameID (e.g., or userName) may be set to the native identity display name or native identity attribute associated with, or configured for, the federated access provider (e.g., AD). This NameID may be unique identifier (e.g., of the user's native account) that allows cloud identity manager 180 to correlate a federated user back to an Identity Cube 153. As an example, the following is a claim rule that may utilized when federated access provider is an ADFS: c:[Type=="http://schemas.microsoft.com/ws/2008/06/identity/claims/windowsaccountname"]=>issue(Type="http://schemas.xmlsoap.org/ws/2005/05/identity/claims/nameidentifier", Issuer=c.Issuer, OriginalIssuer=c.OriginalIssuer, Value=c.Value, ValueType=c.ValueType,Properties["http://schemas.xmlsoap.org/ws/2005/05/identity/claimproperties/format"]= "urn:oasis:names:tc:SAML:2.0:nameid-format:persistent");

The example above may set the userName on the cloud trail event for all assumed roles performed through single sign on through the federated access provider 106 using SAML authentication. This username, for instance, in the case where the federated access provider 106 is AD case, is: \\SAILPOINT\jane.doe. When the cloud service provider 190 logs this SAML role assumption event (e.g., as in the CloudTrail logs of AWS), the cloud service provider 190 uses that example claim rule above to determine what to set the username value to in the event. When the log processor 144 of the cloud identity manager 180 process that event, that username can be determined and utilized to look up the account (e.g., the entitlement representing the account) of the federated service provider 106 (e.g., AD) (e.g., the entitlement representing the AD account) for \\SAILPOINT\jane.doe that is associated with her Identity Cube.

The correlation may be similar if a user (e.g., Jane Doe) accesses the cloud service provider (e.g., AWS) though an IAM User. in this case, the Amazon Resource Name (e.g., a unique identifier utilized by AWS) is the same as the native identity the identity management system 150 (e.g., a connector such as connector 156a) uses to uniquely identify that AWS account (e.g., the entitlement representing the account) on the Identity Cube for the user. So, for example: an IAM User at AWS "jane.doe" might have an ARN "arn:aws:iam::692127186443:user/jane.doe". This information is inherently part of the CloudTrail events as the unique user identity and therefore may be correlated back to the AWS account (e.g., the entitlement representing this account) and her Identity Cube. If such a IAM User assumes a role as well (across accounts for instance) these events may be correlated back to an Identity Cube in a similar fashion because the user's ARN is associated with the CloudTrail events in a similar manner.

In one embodiment, the assumed, assumed roles may be tied together with events occurring during the role session. To continue with the example, in order to tie API access events to a particular user session the RoleSessionName will be set to be unique per session. A nonce or other unique value may thus be concatenated onto the value to the end of the RoleSessionName as in the following example: c:[Type="http://schemas.microsoft.com/ws/2008/06/identity/claims/windowsaccountname", Issuer="AD AUTHORITY"] && c1:[Type="http://schemas.microsoft.com/ws/2008/06/identity/claims/authenticationinstant]=>issue(Type="https://aws.amazon.com/SAML/Attributes/RoleSessionName", Value=RegExReplace(c.Value, "[\\]+", "-")++RegExReplace(c1.Value,"[:]+", "-"));

This above example is a SAML claim that allows log processor 144 to tie assumed role sessions to all the (e.g., API) events for that session. This allows log processor 144 to outline actual unique sessions and all the actions performed just for that session for an identity that has been mapped through the SAML User claim given above. In addition, since unique session identifiers are being utilized, a history of each session may be maintained for the identity to provide a more streamlined and organized historical usage pattern.

Accordingly, the logs 194 obtained from the cloud service provider 190 by the log processor 144 may comprise a set of events, where each event is associated with the IAM entity 192 that performed the event and the user name or session identifier for the session in which the event occurred (and may include other data such the time the event occurred, permissions or conditions associated with an event or a wide variety of other data). The session identifier or username includes the unique identifier for the user (e.g., as provided in the SAML claim used to establish the session with the cloud service provider 190 by the federated service provider 106 through the IAM entity 192).

Log processor 144 can thus parse the log 194 to determine each of the set of events in the log 194. For each event of the log 194, the session identifier associated with that event can be determined. As the unique identifier for the session or user name was created according to the same format (e.g., when including in the SAML claim), the session identifier or user name for the event can be parsed to determine the unique identifier for the user associated with the session. This unique identifier for the user can be used to locate the identity representing that user by, for example, determining an entitlement (or other identity management artifact) at the identity management system 150 associated with that unique identifier (e.g., a native account 151 at the federated access provider 106) and determining which identity has that entitlement. For example, in the case where a native account identifier may be part of the unique identifier associated with the event, as native account 109 at the federated access provider 106 is unique to a particular user, the native account 151 and the associated identity (e.g., Identity Cube 152) at the identity management system 150 assigned that native account 151 may represent the user who accessed the cloud service provider 190 during that session using that IAM entity 192 and performed that event. Thus, by identifying the native account 151 associated with the unique identifier the associated identity may also be located.

That event 146 may thus be associated with that user's Identity Cube 153 and identity management artifact (e.g., synthetic role 157 or IAM entity entitlement 196) with which the event 146 is associated. By making such associations, a user's activity may be tracked and reviewed at a very granular level, allowing not only insight into which users access which IAM entities, but more specifically, what users performed what events using what IAM entities through what federated access entitlements at what time, among other detailed information.

Figure 2A:
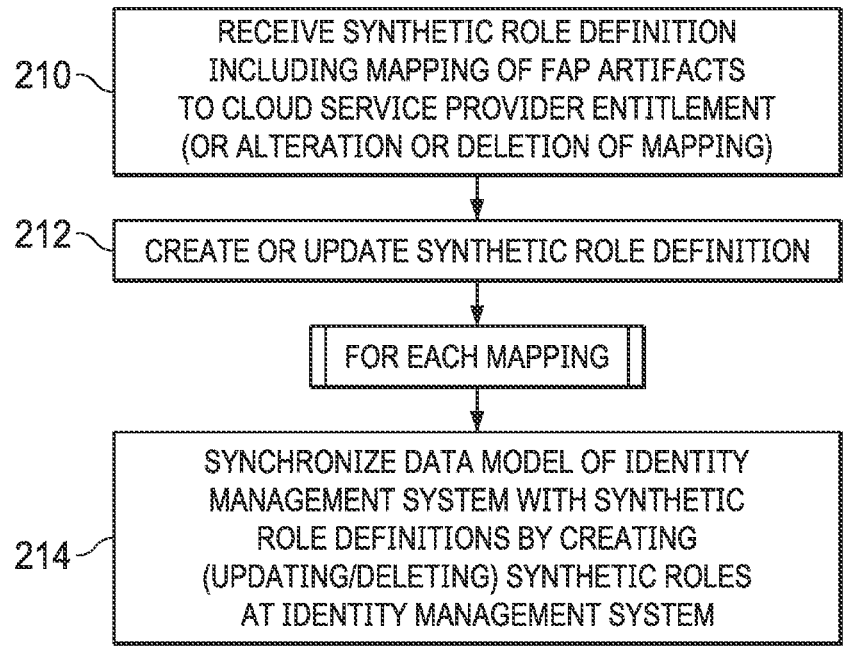
FIGS. 2A, 2B and 2C are flow diagrams of methods that may be utilized by embodiments of an identity management system.
Figure 2B:
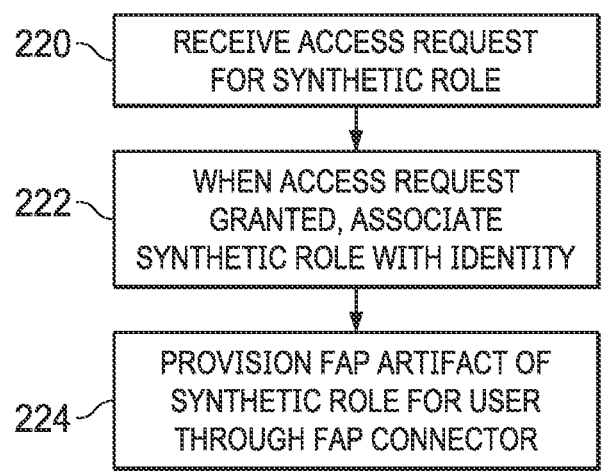
Figure 2C:
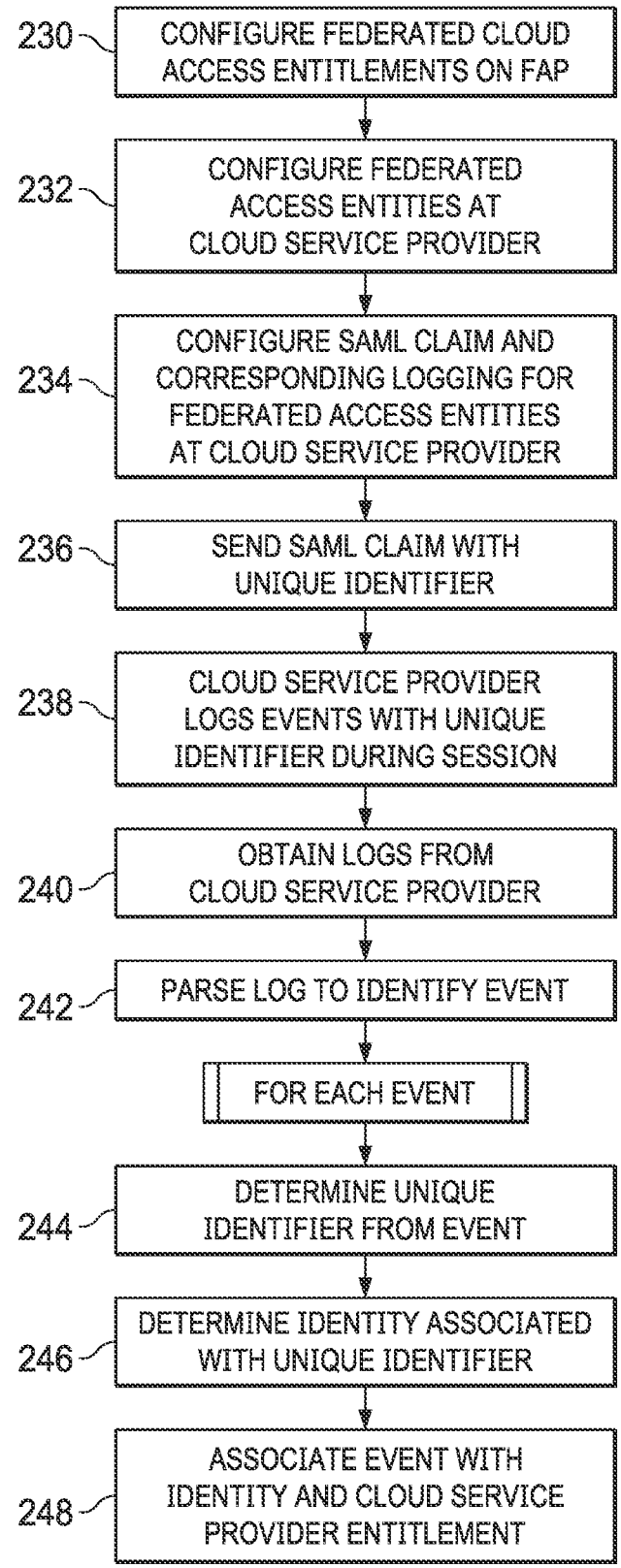

Turning to FIGS. 2A-2C, embodiments of methods of the generation and use of synthetic roles identity manage system are disclosed. First referring to FIG. 2A, to generate a synthetic role initially a synthetic role definition defining a mapping of federated access provider artifacts to a cloud service provider entitlement (or an alteration or deletion of such a mapping) may be received (STEP 210). Such a synthetic role definition may be a new synthetic role definition or an alteration, update or deletion of an existing synthetic role definition. Additionally, a name for the synthetic role may be received as part of the synthetic role definition, where the name is reflective, identical to, or derived from the cloud service provider entitlement of the mapping. The synthetic role definition thus establishes a mapping between a set of identity management artifacts (e.g., cloud access entitlements) associated with a federated access provider and a set of IAM entity entitlements.

A user may utilize an interface of the identity management system to define such a synthetic role definitions such that users can define a synthetic role definition by selecting a cloud access entitlements associated with the federated access provider and selecting one or more IAM entity entitlements associated with the cloud service provider to which those cloud access entitlements grant access. This interface may, for example, allow a user to search by federated access artifacts, and present identity management artifacts associated with the federated access provider. The interface can also present one or more artifacts (e.g., IAM entity entitlements) associated with the cloud service provider and allow the user to select IAM entity entitlements associated with the cloud service provider to be mapped to the selected cloud access entitlements associated with the federated access provider to create and store a synthetic role definition defining the mapping for synthetic role. The interface may also allow the user to define or select a name for the synthetic role, where the name may be, for example, reflective or otherwise aligned with the name of one or more of the selected IAM entity entitlements of the synthetic role associated with the cloud services provider.

The synthetic role definition (or the alteration or deletion to a synthetic role definition) may then be created or updated based on the defined synthetic role definition (STEP 212). This created or updated synthetic role definition is then stored. At some time interval then, the identity management artifacts as maintained in the data model of the identity management system may be synchronized with the synthetic role definitions.

Specifically, for any new synthetic role definitions, a synthetic role may be defined according to the data model for roles utilized by the identity management system, while any existing synthetic roles whose definitions have been updated may be made congruent with the current state of their definition and any deleted synthetic roles associated with deleted synthetic role definitions may be deleted from the data model.

Accordingly, for each synthetic role definition, a corresponding role at the identity management system may be created or updated (STEP 214) by defining that synthetic role according to that synthetic role definition at the identity management system according to a model of such identity management artifacts utilized by the identity management system. Specifically, at some time interval (hourly, daily, weekly, etc.) each synthetic role definition may be evaluated against the roles defined in the identity management artifacts definition to synchronize the definitions of the synthetic roles with the defined role as defined in the identity management artifacts definition. Thus, existing synthetic roles may be updated to reflect the current state of the synthetic role definition or new synthetic roles corresponding to a synthetic role definition may be defined in the identity management artifacts definition of the identity management system.

In one embodiment, during synchronization of the synthetic role definitions with the identity management artifacts as maintained in the data model of the identity management system, if the synchronization cannot be completed with respect to a synthetic role an error message may be given to a user. For example, in certain cases a cloud access entitlement or an IAM entity entitlement that are mapped by the synthetic role may not currently exist in the identity management artifacts as maintained by the identity management system (e.g., it may have been removed at the source system and that removal is reflected in the identity management artifacts or may have been otherwise removed from the identity management artifacts). In these cases, when an underlying cloud access entitlement associated or IAM entity entitlement mapped by the synthetic role no longer exists, an error message may be given.

These defined synthetic roles are thus role identity management artifacts that include the mapping between the IAM entity entitlements associated with the cloud service provider and the cloud access entitlements associated with the federated access provider. Accordingly, the synthetic role is defined as a role according to the model of the identity management system and can be requested, assigned, or otherwise managed or manipulated by, or through, the identity management system like any other type of role utilized with the identity management system, including those that originated or were defined based on data from the source systems of the enterprise.

Moving on to FIG. 2B, at some point a synthetic role may be assigned to an identity by the identity management system. In one case, this assignment may be the result of, for example, an access request submitted by a user for the synthetic role (STEP 220), where that access request has been approved. Such access requests and approvals (or denials) may be submitted, reviewed and accepted (or declined) through interfaces provided by the identity management system. For example, a user may use a search interface of the identity management system to locate a synthetic role based on an entitlement associated at the cloud service provider that the user wishes to access. This search can be based on the users' knowledge of the name of the IAM entity or other entitlement associated with the cloud service provider, or a user's listing of entitlements or other artifacts associated with the cloud service provider. The user may, for example, be able to identify a desired synthetic role as similar or identical to a desired entitlement associated with the cloud service provider based on the name of the synthetic role, that may be reflective or otherwise aligned with the name of one or more of the IAM entity entitlements of the synthetic role associated with the cloud services provider.

When an access request for the synthetic role is granted (or for another reason) the requested synthetic role is associated with the identity (e.g., associated with that user) (STEP 222). In particular, the synthetic role may be assigned to the identity representing the user by associating the synthetic role (e.g., an alphanumeric identifier or the like of the synthetic role) with the Identity Cube for that user's identity. By virtue of the association of the synthetic role with the identity of the user the user is thus also associated with the entitlements mapped by the assigned synthetic role, including both the one or more cloud access entitlements of the federated access provider and the one or more IAM entity entitlements associated with the cloud service provider. In this manner, the identity management system is now representing that the user has these entitlements.

Moreover, when the user is associated with the synthetic role, that user may be provisioned with one or more cloud access entitlements of the synthetic role associated with the federated access provider (STEP 224). Specifically, when the user is assigned the synthetic role the identity management system can access the Identity Cube for the user to determine if the user already has access to these cloud access entitlements. If the user has not already been granted these cloud access entitlements with respect to federated access provider, the identity management system may access the federated access provider to configure the federated access provider such that the federated access provider will provide access to those cloud based entitlements to the user when the user authenticates with the federated access provider (e.g. using their native account at the federated access provider).

Thus, by using a synthetic role, and by virtue of the assignment of the synthetic role to the Identity Cube of a user, a wealth of information may be ascertained or utilized by the identity management system or its users. As discussed, for example, it can be understood from a review of that user's identity that the user has been granted cloud access entitlements and, importantly, that associated IAM entities can be accessed by the user though these cloud access entitlements. Such information may be useful in granting or assigning entitlements, or a review of assigned entitlements, such as in a certification campaign, as these synthetic roles may allow an administrator or other user to view not only the synthetic role associated with a user, but additionally the cloud access entitlements the user has, along with the associated IAM entity entitlements. In this manner, not only can the full scope of a user's entitlement set be ascertained, but additionally the avenues by which that user can utilize such entitlements may be comprehended as well.

It will be noted here, that substantially the reverse may happen when a user is unassigned a synthetic role. For example, an administrator may decide that user no longer needs access to the cloud service provider or otherwise should have such a synthetic role and may unassign the synthetic role. This deprovisioning may result in the underlying access rights being revoked in a similar manner to which they were provisioned.

To elaborate in more detail, when a synthetic role is unassigned to an identity by the identity management system, the association of the synthetic role with the identity (e.g., associated with that user) may be removed. In particular, the association of the synthetic role (e.g., an alphanumeric identifier or the like of the synthetic role) with the Identity Cube for that user's identity may be deleted or otherwise removed. By virtue of the removal of this association of the synthetic role with the identity of the user the user is thus also unassociated with the entitlements mapped by the assigned synthetic role, including both the one or more cloud access entitlements of the federated access provider and the one or more IAM entity entitlements associated with the cloud service provider. In this manner, the identity management system is now representing that the user has no longer has these entitlements.

Moreover, when the user is unassigned the synthetic role, that user may be deprovisioned with one or more cloud access entitlements of the synthetic role associated with the federated access provider. Specifically, the identity management system may access the federated access provider to configure the federated access provider such that the federated access provider will remove access to those cloud based entitlements associated with the synthetic role from the user, such that when the user authenticates with the federated access provider (e.g. using their native account at the federated access provider) they will no longer have access to these cloud based entitlements (and thus will no longer be able to access the corresponding IAM entities at the cloud service provider.

In many cases, however, users of identity management system may not only desire to assess the entitlements or other identity management artifacts associated with an identity (e.g., user), but may also desired to determine how a user actually uses their entitlements, and in particular how they utilize their entitlements related to the cloud service provider. Referring to FIG. 2C, one embodiment of a method that may be utilized by an identity management system to allow a user's activity with respect to entitlements associated with the cloud service provider to be determined is depicted.

Initially, both the federated cloud access entitlement at the federated access provider and the federated access entities (e.g., IAM entities that may be accessed through single sign on) may be configured (STEPS 230, 232). As part of the configuration of the federated access entities at the cloud service provider, a SAML claim and the logging of data with respect to these entities or the enterprises accounts may also be configured (STEP 234). To illustrate in more detail, the cloud service provider may maintain logs of the various events that occurred with respect to a session or other access initiated using an IAM entity. For example, AWS may maintain CloudTrail logs that records event history and activity for users that access AWS through an IAM entity. The data that these logs include for each event may often times be configurable by the enterprise in association with the IAM entities used to access the cloud service provider by that enterprise to include, for example, operations performed on or within a resource or API actions.

A user associated with the enterprise such as an administrator may configure cloud access entitlements on the federated access provider within the enterprise and may also configure IAM entities accessible through federated access at the cloud service provider, such that each of the cloud access entitlement on the federated access provider may be configured to allow access to the cloud service provider though at least one of the IAM entities and have the access rights assigned that federated access IAM entity.

Therefore, in one embodiment, the federated access provider and federated access IAM entities are configured such that during the single sign on process a unique identifier for a user is passed to the cloud service provider as part of the single sign on process for the IAM entity through the federated access provider. This unique identifier can, for example, be an identifier associated with the user's native account at the federated access provider. As but one example, the federated access provider and the cloud service provider may be configured to implement single sign on to the IAM entities of the cloud service provider through the federated access provider using SAML. Accordingly, in one embodiment, the SAML claim that may be exchanged between the federated service provider and the cloud service provider may be configured to include the unique identifier for the user, such as the identifier associated with the user's native account at the federated access provider.

In one specific embodiment, for example, a user name (e.g., userName or NameID) or name for the session (e.g., the RoleSessionName) to be created at the cloud service provider using the SAML claim from the federated access provider may include the identifier for the user. This (e.g., user or session) name may also include a unique value such as a nonce or Globally Unique Identifier (GUID) such that a unique value can be created from the combination of the identifier and the unique value (e.g., by concatenating the two values). By creating a session name in this manner, a unique session identifier can be created where the unique session identifier includes the unique identifier for the user in a standard manner. To illustrate in more detail, a cloud service provider such as AWS may expect certain attributes in the SAML claim, including, for example, a NameID or a RoleSessionName. In one embodiment, the NameID or RoleSessionName may be set to the native identity display name or native identity attribute associated with, or configured for, the federated access provider (e.g., AD). This NameID may be unique identifier (e.g., of the user's native account) that allows cloud identity manager to correlate a federated user back to an Identity Cube.

Thus, when a user signs on the to the federated access provider and accesses an IAM entity of the cloud service provider using a cloud access entitlement of the federated access provider, a SAML claim according to this configuration or the like may be exchanged between the federated access provider and the cloud service provider (STEP 236). Accordingly, when a session is created in association with that particular IAM entity at the cloud service provider, the session is identified by the unique session name (including the unique identifier for the user) and each event logged by the cloud service provider in the logs for that session will include the created session name passed in the SAML claim (STEP 238). Additionally, as has been described the logs may be configured to include other data in each event, including for example the IAM entity that initiated the event or the cloud access entitlement used to access the IAM entity. For example, the logs may include an event for assuming an IAM entity and a set of events delimiting what that IAM entity did during that session.

The log kept by the cloud service provider may thus be obtained by the identity management system (STEP 240). These logs may be obtained at some time intervals, such as nightly, weekly, hourly or at some other time interval). These logs (e.g., CloudTrail logs as used by AWS or the like) may include a set of events, where each event may be associated with user name or the session identifier for the session in which the event occurred (and may incudes other data such as the IAM entity that performed the event, the time at which the event was performed, the time the event occurred, permissions or conditions associated with an event or a wide variety of other data). The session identifier or user name may include the unique identifier for the user (e.g., as provided in the SAML claim used to establish the session with the cloud service provider by the federated service provider through the IAM entity).

The log can thus be parsed to determine each of the set of events in the log (STEP 240). For each event of the log, the session identifier or username associated with that event can be determined. As the unique identifier for the session or user name was created according to the same format (e.g., when including in the SAML claim), the session identifier or user name for the event can be parsed to determine the unique identifier for the user associated with the event (STEP 242). This unique identifier for the user can be used to locate the identity representing that user by, for example, determining the entitlement (or other identity management artifact) at the identity management system associated with that unique identifier (e.g., a native account at the federated access provider) and determining which identity has that entitlement (STEPS 244, 246).

For example, in the case where a native account identifier may be part of the unique identifier associated with the event, as a native account at the federated access provider is unique to a particular user, the identification of such a native account at the identity management system may also serve to uniquely identify the associated identity (e.g., Identity Cube) representing the user who accessed the cloud service provider during that session using that IAM entity and performed that event. Thus, by identifying the native account associated with the unique identifier the associated identity may also be located.

The event can then be associated with the identified identity (STEP 248) and, in some instances the IAM entity to conduct that event. By making such associations, a user's activity may be tracked and reviewed at a very granular level, allowing not only insight into which users access which IAM entities, but more specifically, what users performed what events using what IAM entities through what federated access entitlements at what time, among other detailed information.

It may now be useful to an understanding of embodiments as disclosed herein to discuss particular embodiments of interfaces that may be employed by an identity management system. As discussed, in one embodiment, an identity management system may utilize an interface (e.g., presented over a web browser, in an application, etc.) that that allows the definition of a synthetic role and shows how federated access artifacts such as entitlements or groups are being mapped to IAM entity entitlements for the synthetic role being created. Looking at FIG. 3A, one embodiment of such an interface is presented. Here, the example interface shows an interface that may be employed by an identity management system to allow a user to configure the mapping of a cloud access entitlement (e.g., a federated access provider artifact such as an AD group) to an IAM entity (e.g., an AWS Federated Role that can be assumed by having that AD group provisioned as an entitlement to a user). Such an interface may be configured to allow a user to define a task that when executed during a synchronization of the synthetic role definitions with the synthetic roles define in the system will create the synthetic role definition defined in the interface and the corresponding synthetic role at the identity monument system.

Here, mappings have been defined that include, for example, that having the 'EngineeringAdmin' AD entitlement will give the AWS Federated Role 'arn:aws:iam:692127186443:role/FederatedAdminAccess'. It can also be seen from the 'AWS Federation Role' dropdown and the 'Enterprise Directory Group' dropdown where such mappings can be selected an added (e.g., by clicking the 'Add' button such a mapping may be added to the 'Federation Role Mapping' table displayed directly below.

In some embodiments, a regular expression search (in the Group RegEx box) through the interface may match any other identity management artifacts (e.g., groups) that meet that expression to allow such identity management artifacts to be added to the mappings (not shown). For example, to match a setup where groups matching AWS-<AWS_account_id>-<AWS_role_name> are properly mapped by the syntenic role synchronization task: AWS-(.+)-(.+). As but one example, the Active Directory group named AWS-492127186003-FederatedAdminAccess would be parsed and the role FederatedAdminAccess within AWS account 492127186003 would be automatically mapped through a newly created synthetic role.

The mappings defined (e.g., the manual mappings or the mapping defined through the regular expression search) are what define the synthetic roles that can eventually be requested through an access request by a user. Accordingly, when a task configured using the example of the interface is run, the identity management system will utilize the synthetic role definition as defined in the interface to create the synthetic role. Thus, FIG. 3B presents an example of an interface that displays that the corresponding synthetic role 'AWS Federated Access to p.org.demo/FederatedAdminAccess' with type 'Federation' that has been created at the identity management system automatically from the mapping established in the example interface of FIG. 3A. The "Direct Entitlement" displayed shows the AD entitlement provisioned to an AD account (EngineeringAdmin).

Figure 4A:
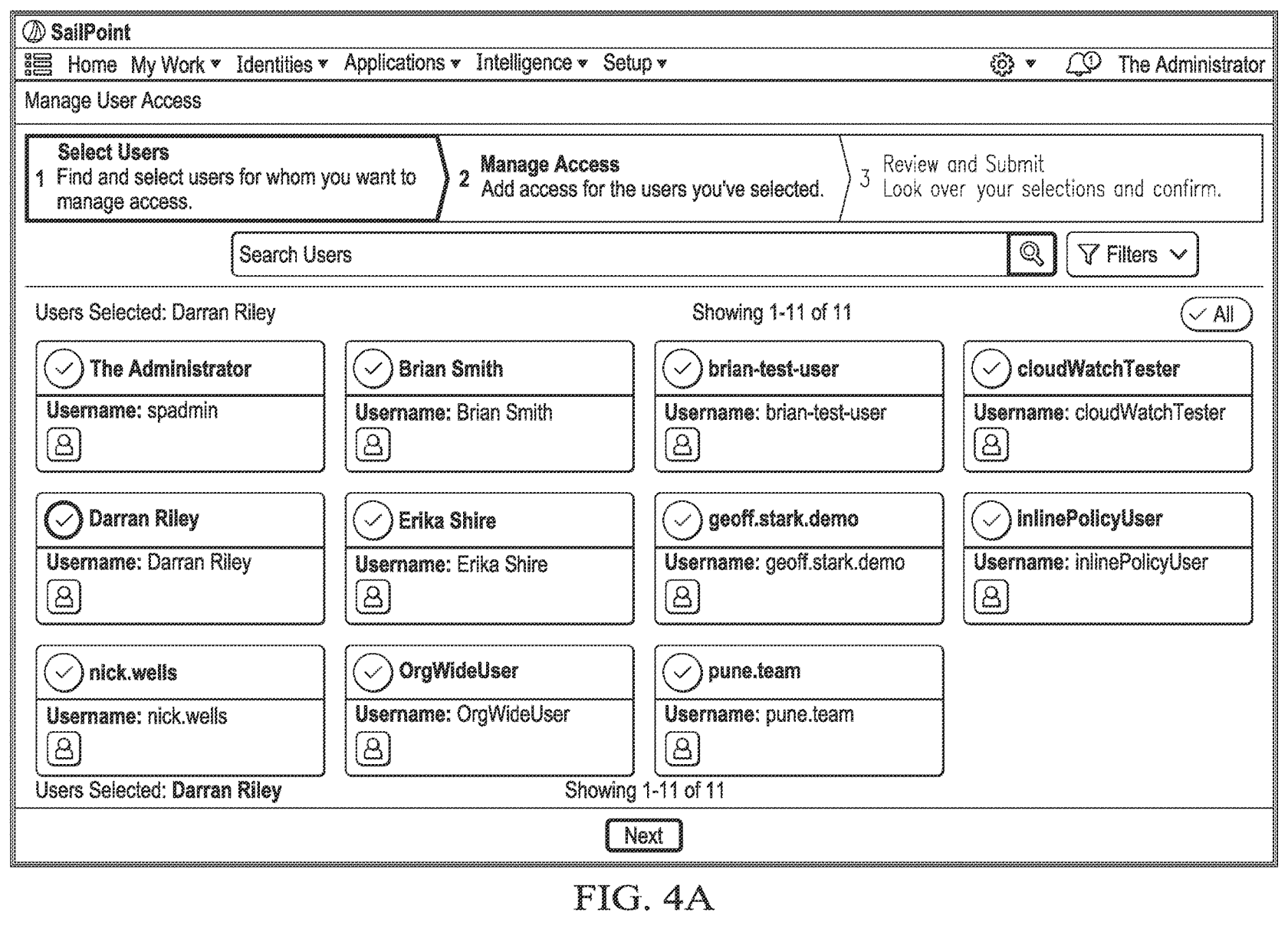
Figure 4B:
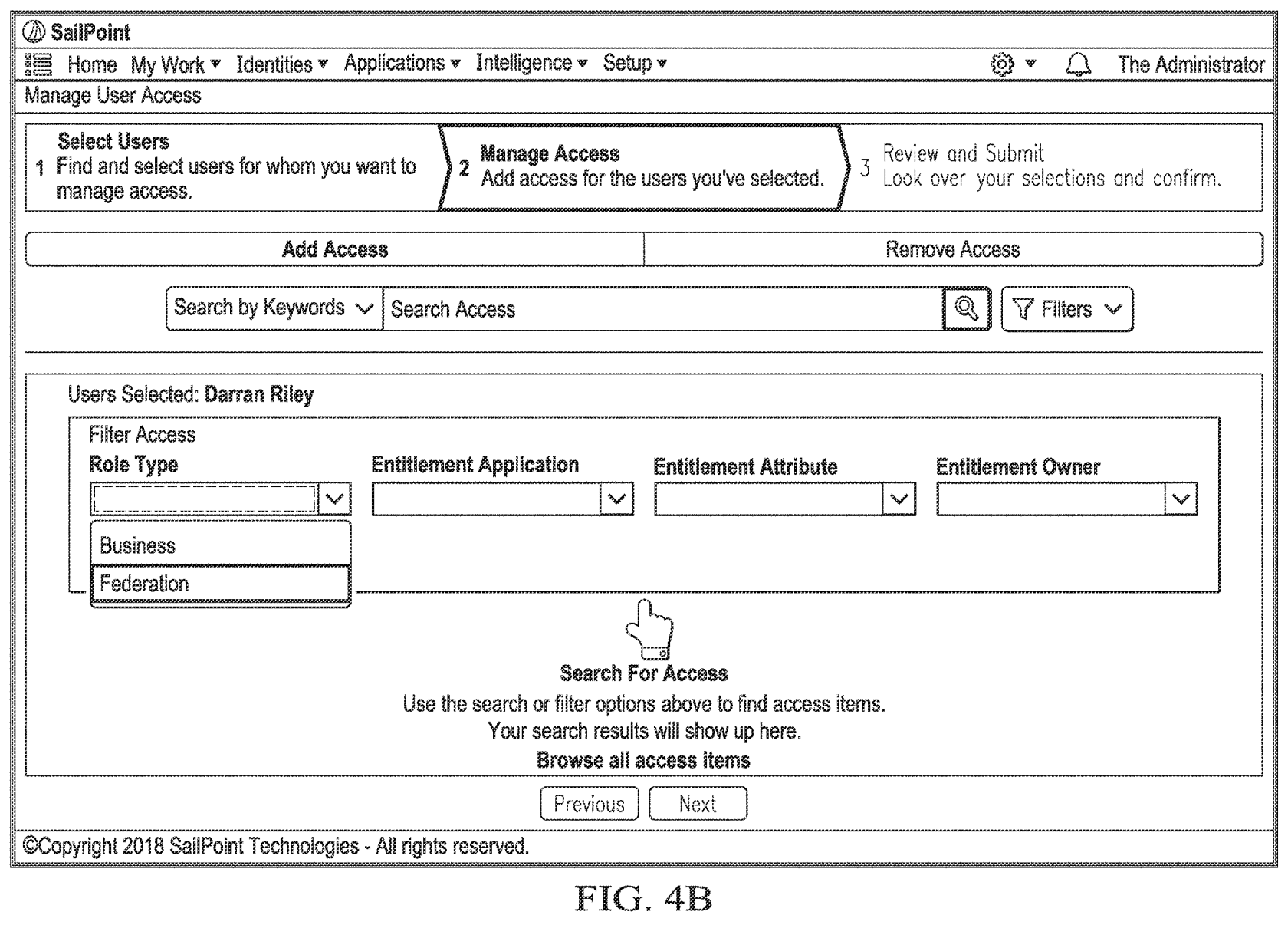

Moving on to FIGS. 4A-4C embodiments of interfaces for users searching for and selecting a synthetic role and requesting access to a synthetic role are depicted. FIG. 4A for example, shows someone requesting access for Darran Riley. Continuing with this access request, FIG. 4B shows the access request for Darran Riley where the requester is filtering for 'Federation' synthetic roles which will only show roles that have been created through the mappings used to create the synthetic roles. FIG. 4C shows the result of that previous filter applied in FIG. 4B. The first synthetic role shown is 'AWS Federated Access to sp.org.demo/FederatedAdminAccess'. Here, this synthetic role may be selected and would be submitted and provisioned by the identity management system at the federated access provider (e.g., Active Directory) by adding Darran Riley to the Engineering Admin group.

Figure 5:

FIG. 4D depicts an embodiment of an interface whereby the identity management artifacts associated with a user (e.g. the user's Identity Cube) can be reviewed. Here, it can be seen that a user can be associated with an AWS Federated Access role that is a synthetic role. FIG. 5 depicts an example of an interface that may display portions of a CloudTrail log, including events determined for that identity and associated the Identity Cube for that identity.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

APPENDIX

EXAMPLE MODELS

Entitlement Model
"entitlement": {"attribute":
"text", "description":
"text", "displayName":
"text", "id": "keyword",
"identityCount": "integer",
"modified": "date",
"name": "text",
"privileged": "boolean",
"@tags": {"id": "keyword"
    "name": "text",
        "type": "TAG"},
"source": {"id": "keyword",
"name": "text"},
"synced": "date",
"value": "text"},
Sample { "privileged": false,
"displayName":
"Administrator", "name": "Administrator",
"description": "Full administrative access to IdentityNow", "modified": 1534184384805,
"id": "ff8081815c46b85b015c46b90d5702a9",
"tags": [ {"id": "2c9084ee5a8ad545345345a8de370110083"
    "name": "SOD-SOX",
        "type": "TAG" }, {
  "id": "2c9084ee5a8ad545345345a8de370122093"
    "name": "PrivilegedAccess",
        "type": "TAG"}, ]
"source": {"name": "IdentityNow",
"id": "ff8081815c46b85b015c46b90c7c02a6"},
"attribute": "assignedGroups", "identityCount": 5,
"value": "ORG_ADMIN",
"org": "navigate",
"pod": "royale",
"synced": "2018-09-04T03:30:23.853Z"}
Event Model
"event": {    "action": "keyword",
"actor": {    "name": "keyword",
"type": "keyword" },
"attributes": { //"dynamic object" "SSO": { "contextId": "keyword",
"ipAddress": "keyword"    },
"accountName": "text", "error": "text",
"newValue": "text", "oldValue": "text", "requester": { "comments": "text", "name":
   "keyword",
"type": "keyword"   },
"reviewer": { "comments": "text", "name": "keyword", "type": "keyword" },
    "sourceName": "text" },
"created": "date", "description": "text", "hostname": "keyword",
"id": "keyword",
"ipAddress": "keyword", "requestId": "keyword", "stack": "keyword",
"synced": "date",
"target": {    "name": "keyword",
"type": "keyword" },
"type": "text" }
Sample
{"id": "1aecf630-1e99-4541-aa29-a4524df406c3", "action": "AUTHENTICATION-
   103",
"type": "AUTH",
"actor": {    "name": "support", "type": null},
"target": {    "name": "support", "type": null},
"created": "2018-07-12T20:57:56.872Z",
"stack": "SSO",
"requestId": null,
"hostname": "207.189.160.228", "ipAddress": "207.189.160.228", "description": null,
"attributes": {"sourceId": null, "sourceName": "DataStore" },
"pod": "royale", "org": "navigate", "modified": null,
"synced": "2018-07-12T20:57:57.836Z"}

APPENDIX-continued

EXAMPLE MODELS

Identity Model
"identity": {"@access": {   "attribute": "text", "description": "text", "disabled": "boolean"
   "displayName": "text", "id": "keyword",
"name": "text", "owner": {   "displayName": "text", "id": "keyword",
"name": "text" },
"privileged": "boolean", "source": { "id": "keyword",
"name": "text" },
"standalone": "boolean", "type": "keyword", "value": "text" },
"@tags": {
  "id": "keyword"
    "name": "text",
      "type": "TAG"   },
"(@accounts": {"accountId": "text", "created": "date", "disabled": "boolean",
"entitlementAttributes": "object", "id": "keyword",
"locked": "boolean", "manuallyCorrelated": "boolean", "name": "text", "passwordLastSet":
   "date", "privileged": "boolean",
"source": {"id": "keyword", "name": "text", "type": "keyword" } },
"@apps": {"account": {   "accountId": "text",
"id": "keyword"},
"id": "keyword", "name": "text", "source": {   "id": "keyword",
"name": "text" } },
"(@groups": {   "id": "keyword", "name": "text"   },
"accessCount": "integer", "accessProfileCount": "integer", "accountCount": "integer",
   "appCount": "integer", "attributes": "dynamic object", "created": "date",
   "displayName": "text",
"email": "text", "employeeNumber": "keyword", "entitlementcount": "integer", "firstName"
   "text", "groupCount": "integer",
"id": "keyword", "identityProfile": {   "id": "keyword",
"name": "text" },
"inactive": "boolean", "isManager": "boolean", "lastModified": "date", "lastName": "text",
   "manager": { "displayName": "text", "id": "keyword", "name": "text"
     },
"modified": "date", "name": "text", "phone": "keyword", "processingDetails": {
"date": "date", "message": "text", "retryCount": "integer", "stackTrace": "text",
"stage": "keyword"   },
"processingstate": "keyword", "roleCount": "integer", "source": {   "id": "keyword",
"name": "text" },
"status": "keyword", "synced": "date"}
Sample
{   "id": "2c9180865c45e7e3015c46c434a80622", "name": "ad.admin",
"displayName": "AD Admin", "firstName": "AD", "lastName": "Admin",
"email": "SLPT.CLOUD.SAILPOINT.TEST+AD-ADMIN@GMAIL.COM", "phone": null,
"created": 1495835882664, "modified": 1534899614297, "inactive": false,
"status": "UNREGISTERED", "employeeNumber": null, "manager": null,
"isManager": false, "source": {
"name": "EndToEnd-ADSource",
"id": "2c9180855c45b230015c46c19b9c0202"   },
"processingDetails": null, "processingstate": null, "attributes": {
"uid": "ad.admin", "firstname": "AD",
"cloudAuthoritativeSource": "2c9180855c45b230015c46c19b9c0202", "cloudStatus":
   "UNREGISTERED",
"iplanet-am-user-alias-list": null, "displayName": "AD Admin", "internalCloudStatus":
   "UNREGISTERED", "workPhone": "512-942-7578",
"email": "SLPT.CLOUD.SAILPOINT.TEST+AD-ADMIN@GMAIL.COM", "lastname":
   "Admin"   },
"tags": [   {   "id": "2c9084ee5a8ad545345345a8de370110083"
     "name": "SOD-SOX",
        "type": "TAG"
   },{   "id": "2c9084ee5a8ad545345345a8de370122093"
     "name": "PrivilegedAccess",
        "type": "TAG"   },   ]
"accounts": [ {   "id": "2c9180865c45e7e3015c46c434a80623", "name": "ad.admin"
"accountId": "CN=AD Admin,OU=slpt- automation,DC=TestAutomationAD,DC=local",
"source": { "name": "EndToEnd-ADSource",
"id": "2c9180855c45b230015c46c19b9c0202", "type": "Active Directory - Direct" },
"disabled": false, "locked": false, "privileged": false,
"manuallyCorrelated": false, "passwordLastSet": 1451577767262, "entitlementAttributes":
   {   "memberOf": [
"CN=SpecificUsersFromSource-cloud.user,OU=Automation_Users,OU=slpt-
   automation,DC=TestAutomationAD,DC=local",
"CN=TestProvisioningGroup1,OU=provisioningTests,OU=slpt-
   automation,DC=TestAutomationAD,DC=local",
"CN=texas-sales,OU=Texas,OU=Americas,OU=slpt-automation-
   unused, DC=TestAutomationAD,DC=local",
"CN=texas-engineering,OU=Texas,OU=Americas,OU=slpt-automation-
   unused,DC=TestAutomationAD,DC=local",
"CN=UnittestNoOneBelongsToThisGroup,OU=LauncherTestOrg,OU=slpt-
   automation,DC=TestAutomationAD,DC=local", APPENDIX-continued

EXAMPLE MODELS

"CN=cloud support,OU=Automation_Users,OU=slpt-
automation,DC=TestAutomationAD,DC=local",
"CN=cloud development,OU=Automation_Users,OU=slpt-
automation,DC=TestAutomationAD,DC=local",
"CN=cloud testing,OU=Automation_Users,OU=slpt-
automation,DC=TestAutomationAD,DC=local",
"CN=LauncherTestGroup3,OU=LauncherTestOrg,OU=slpt-
automation,DC=TestAutomationAD,DC=local",
"CN=LauncherTestGroup2,OU=LauncherTestOrg,OU=slpt-
automation,DC=TestAutomationAD,DC=local",
"CN=LauncherTestGroup1 ,OU=LauncherTestOrg,OU=slpt-
automation,DC=TestAutomationAD,DC=local",
"CN=globb,OU=HierarchicalGroups,OU=slpt-automation-
unused, DC=TestAutomationAD,DC=local",
"CN=globa,OU=HierarchicalGroups,OU=slpt-automation-
unused, DC=TestAutomationAD,DC=local",
"CN=DistTierlIniversal,OU=HierarchicalGroups,OU=slpt-automation-
unused,DC=TestAutomationAD,DC=local",
"CN=DistTierGlobal,OU=HierarchicalGroups,OU=slpt-automation-
unused, DC=TestAutomationAD,DC=local",
"CN=DistTier4,OU=HierarchicalGroups,OU=slpt-automation-
unused, DC=TestAutomationAD,DC=local",
"CN=GoldEntitlement,OU=testRegion,OU=slpt-automation-
unused,DC=TestAutomationAD,DC=local",
"CN=DiamondEntitlement,OU=testRegion,OU=slpt-automation-
unused,DC=TestAutomationAD,DC=local",
"CN=Denied RODC Password Replication
Group,CN=Users,DC=TestAutomationAD,DC=local
", "CN=Group Policy Creator
Owners,CN=Users,DC=TestAutomationAD,DC=local",
"CN=Domain Guests,CN=Users,DC=TestAutomationAD,DC=local", "CN=Domain
Admins,CN=Users,DC=TestAutomationAD,DC=local", "CN=Enterprise
Admins,CN=Users,DC=TestAutomationAD,DC=local", "CN=Schema
Admins,CN=Users,DC=TestAutomationAD,DC=local",
"CN=Guests,CN=Builtin,DC=TestAutomationAD,DC=local",
"CN=Administrators,CN=Builtin,DC=TestAutomationAD,DC=local" ] },
"created": 1495835882664 }, {
"id": "2c918083606d670c01606f35a30a0349", "name": "ad.admin",
"accountId": "ad.admin", "source": {
"name": "IdentityNow",
"id": "ff8081815c46b85b015c46b90c7c02a6", "type": "IdentityNowConnector" },
"disabled": false, "locked": false, "privileged": false,
"manuallyCorrelated": false, "passwordLastSet": null, "entitlementAttributes": {}, "created":
1513694274314 } ], "accountCount": 2, "apps": [ { "id":
"22751",
"name": "ADP Workforce Now", "source": { "name": "Corporate Active Directory",
"id": "2c9180855c45b230015c46e2f6a8026a" },
"account": { "id": "2c9180865c45efa4015c470be0de1606", "accountId": "CN=Barbara
Wilson,OU=Austin,OU=Americas,OU=Demo,DC=seri,DC=sailpointdemo,DC=com" }
} ],"appCount": 1, "access": [ {
"privileged": false, "attribute": "memberOf",
"value": "CN=Administrators,CN=Builtin,DC=TestAutomationAD,DC=local", "source": {
"name": "EndToEnd-ADSource",
"id": "2c9180855c45b230015c46c19b9c0202" },
"standalone": false,
"id": "2c9180865c45e7e3015c46c457c50755", "type": "ENTITLEMENT",
"name": "Administrators", "displayName": "Administrators", "description": null
}, { "owner": { "id": "2c9180865c45e7e3015c46c434a80622", "name":
"ad.admin",
"displayName": "AD Admin" },
"source": { "name": "EndToEnd-ADSource",
"id": "2c9180855c45b230015c46c19b9c0202" },
"id": "2c918083634bc6cb01639808d40270ba", "type": "ACCESS_PROFILE",
"name": "test [AccessProfile-1527264105448]", "displayName": "test",
"description": "test" }, { "disabled": false, "owner": {
"id": "2c9180865c45e7e3015c46c5030707a0", "name": "will.albin",
"displayName": "Albin Will" },
"id": "2c9180865decdaa5015e06598b293108", "type": "ROLE",
"name": "test [cloudRole-1503345085223]", "displayName": "test",
"description": "test" } ],
"accessCount": 3, "entitlementcount": 1, "roleCount": 1, "accessProfileCount": 1,
"identityprofile": { "id": "2c918085605c8d0601606f357cb231e6",
"name": "E2E AD" },
"org": "navigate", "pod": "royale",
"synced": "2018-08-22T19:54:54.302Z" } }

APPENDIX-continued

EXAMPLE MODELS

Role Model
"role": {"id": "keyword", "name": "text", "description": "text",
"modified": "date", // ISO 8601 format "created": "date", // ISO 8601 format "enabled"
   "boolean",
"requestable": "boolean",
"@tags": {    "id": "keyword"
    "name": "text",
       "type": "TAG"    },
"accessProfiles: {    "id": "keyword",
"name": "keyword",    },
"accessProfileCount: "integer", "owner": {
"id": "keyword",
"name": "text" },
"synced": "date"    }
Sample
{    "id": "id",
"name": "name", "description": "description",
"modified": "2018-09-07T17:49:33.667Z", "created": "2018-09-07T17:49:33.667Z",
   "enabled": true,
"requestable": true,
"tags":[    {    "id": "2c9084ee5a8ad545345345a8de370110083"
       "name": "SOD-SOX",
          "type": "TAG"    },    {
    "id": "2c9084ee5a8ad545345345a8de370122093"
       "name": "PrivilegedAccess",
          "type": "TAG"    },    ]
"accessProfiles": [    {    "id": "accessProfileId",
   "name": "accessProfileName"    }    ],
"accessProfileCount": 1, "owner": {    "name": "displayName",
"id": "ownerId"    },
"synced": "2018-09-07T17:49:33.667Z"    }

What is claimed is:

1. An identity management system for identity management of cloud based computing services, comprising:
a processor device; and
a non-transitory, computer-readable storage medium, including computer instructions for:
providing an interface to obtain synthetic role information from a user;
determining a synthetic role definition based on the obtained synthetic role information, the synthetic role definition comprising a mapping between an Identity and Access Management (IAM) entity entitlement and a cloud access interface entitlement;
obtaining identity management data from one or more source systems, the identity management data comprising data on a set of identity management artifacts utilized in identity management for a distributed enterprise computing environment, wherein the source systems include a federated access provider and a cloud service provider;
determining, from the identity management data, the IAM entity entitlement representing a first access right associated with an IAM entity of the cloud service provider, the IAM entity associated with the enterprise;
determining, from the identity management data, the cloud access entitlement associated with the federated access provider, wherein the cloud access entitlement represents a second access right associated with the IAM entity of the cloud service provider, the second access right provided through the federated access provider;
generating a synthetic role at the identity management system based on the determined synthetic role definition, wherein the generated synthetic role associates the IAM entity entitlement and the cloud access entitlement;
assigning the generated synthetic role to a first identity and provisioning a native account of the first identity at the federated access provider;
obtaining an event log from the cloud service provider, wherein the event log includes events associated with the IAM entity of the cloud service provider;
determining one or more events of the event log associated with the first identity; and
associating the one or more events with the first identity based on the IAM entity entitlement representing the first access right for the IAM entity.

2. The system of claim 1, wherein the interface is configured to present one or more artifacts associated with the cloud service provider to the user and to receive one or more selections from the user of one or more artifacts associated with the cloud service provider to be mapped to user selected artifacts associated with the federated access provider.

3. The system of claim 1, wherein the interface is configured to receive input from the user to initialize searching by federated access artifacts, and to present, to the user, search results including one or more identity management artifacts associated with the federated access provider.

4. The system of claim 1, wherein the interface is configured to obtain, from the user, a name for the synthetic role definition.

5. The system of claim 1, wherein the synthetic role is defined as a role according to a model of the identity management system.

6. The system of claim 1, wherein the instructions are further for initiating access to the federated access provider within the enterprise to configure the federated access provider to provide access to the user of one or more entitlements, in response to the user authenticating with the federated access provider.

7. The system of claim 1, wherein the instructions are further for assigning the synthetic role to a first identity based on an access request submitted by the user for the synthetic role.

8. A method for identity management of cloud based computing services, comprising:
- providing an interface to obtain synthetic role information from a user;
- determining a synthetic role definition based on the obtained synthetic role information, the synthetic role definition comprising a mapping between an Identity and Access Management (IAM) entity entitlement and a cloud access interface entitlement;
- obtaining identity management data from one or more source systems, the identity management data comprising data on a set of identity management artifacts utilized in identity management for a distributed enterprise computing environment, wherein the source systems include a federated access provider and a cloud service provider;
- determining, from the identity management data, the IAM entity entitlement representing a first access right associated with an IAM entity of the cloud service provider, the IAM entity associated with the enterprise;
- determining, from the identity management data, the cloud access entitlement associated with the federated access provider, wherein the cloud access entitlement represents a second access right associated with the IAM entity of the cloud service provider, the second access right provided through the federated access provider;
- generating a synthetic role at the identity management system based on the determined synthetic role definition, wherein the generated synthetic role associates the IAM entity entitlement and the cloud access entitlement;
- assigning the generated role to a first identity and provisioning a native account of the first identity at the federated access provider;
- obtaining an event log from the cloud service provider, wherein the event log includes events associated with the IAM entity of the cloud service provider;
- determining one or more events of the event log associated with the first identity; and
- associating the one or more events with the first identity based on the IAM entity entitlement representing the first access right for the IAM entity.

9. The method of claim 8, wherein the interface is configured to present one or more artifacts associated with the cloud service provider to the user and to receive one or more selections from the user of one or more artifacts associated with the cloud service provider to be mapped to user selected artifacts associated with the federated access provider.

10. The method of claim 8, wherein the interface is configured to receive input from the user to initialize searching by federated access artifacts, and to present, to the user, search results including one or more identity management artifacts associated with the federated access provider.

11. The method of claim 8, wherein the interface is configured to obtain, from the user, a name for the synthetic role definition.

12. The method of claim 8, wherein the synthetic role is defined as a role according to a model of the identity management system.

13. The method of claim 8, further comprising initiating access to the federated access provider within the enterprise to configure the federated access provider to provide access to the user of one or more entitlements, in response to the user authenticating with the federated access provider.

14. The method of claim 8, further comprising assigning the synthetic role to a first identity based on an access request submitted by the user for the synthetic role.

15. A non-transitory computer readable storage medium, comprising instructions when executed for identity management of cloud based computing services to perform the steps of:
- providing an interface to obtain synthetic role information from a user;
- determining a synthetic role definition based on the obtained synthetic role information, the synthetic role definition comprising a mapping between an Identity and Access Management (IAM) entity entitlement and a cloud access interface entitlement;
- obtaining identity management data from one or more source systems, the identity management data comprising data on a set of identity management artifacts utilized in identity management for a distributed enterprise computing environment, wherein the source systems include a federated access provider and a cloud service provider;
- determining, from the identity management data, the IAM entity entitlement representing a first access right associated with an IAM entity of the cloud service provider, the IAM entity associated with the enterprise;
- determining, from the identity management data, the cloud access entitlement associated with the federated access provider, wherein the cloud access entitlement represents a second access right associated with the IAM entity of the cloud service provider, the second access right provided through the federated access provider;
- generating a synthetic role at the identity management system based on the determined synthetic role definition, wherein the generated synthetic role associates the IAM entity entitlement and the cloud access entitlement;
- assigning the generated synthetic role to a first identity and provisioning a native account of the first identity at the federated access provider;
- obtaining an event log from the cloud service provider, wherein the event log includes events associated with the IAM entity of the cloud service provider;
- determining one or more events of the event log associated with the first identity; and
- associating the one or more events with the first identity based on the IAM entity entitlement representing the first access right for the IAM entity.

16. The non-transitory computer readable medium of claim 15, wherein the interface is configured to present one or more artifacts associated with the cloud service provider to the user and to receive one or more selections from the user of one or more artifacts associated with the cloud service provider to be mapped to user selected artifacts associated with the federated access provider.

17. The non-transitory computer readable medium of claim 15, wherein the interface is configured to receive input from the user to initialize searching by federated access artifacts, and to present, to the user, search results including one or more identity management artifacts associated with the federated access provider.

18. The non-transitory computer readable medium of claim 15, wherein the interface is configured to obtain, from the user, a name for the synthetic role definition.

19. The non-transitory computer readable medium of claim 15, wherein the synthetic role is defined as a role according to a model of the identity management system.

20. The non-transitory computer readable medium of claim 15, wherein the instructions are further for initiating access to the federated access provider within the enterprise to configure the federated access provider to provide access to the user of one or more entitlements, in response to the user authenticating with the federated access provider.

21. The non-transitory computer readable medium of claim 15, wherein the instructions are further for assigning the synthetic role to a first identity based on an access request submitted by the user for the synthetic role.

* * * * *